US012801832B2

(12) United States Patent
Mehta et al.

(10) Patent No.: US 12,801,832 B2
(45) Date of Patent: Nov. 17, 2026

(54) AUTOMATED STRUCTURED DATA OBJECT CREATION AND LOCATION INTEGRATION INTO MULTIPLE LOCATION APPLICATIONS

(71) Applicants: Jatin V. Mehta, Voorhees, NJ (US); Stephen Joslyn Myers, Bear, DE (US)

(72) Inventors: Jatin V. Mehta, Voorhees, NJ (US); Stephen Joslyn Myers, Bear, DE (US)

( * ) Notice: Subject to any disclaimer, the term of this patent is extended or adjusted under 35 U.S.C. 154(b) by 0 days.

(21) Appl. No.: 17/692,185

(22) Filed: Mar. 11, 2022

(65) Prior Publication Data

US 2022/0292253 A1 Sep. 15, 2022

Related U.S. Application Data

(60) Provisional application No. 63/220,996, filed on Jul. 12, 2021, provisional application No. 63/159,504, filed on Mar. 11, 2021.

(51) Int. Cl.
*G06F 40/154* (2020.01)
*G06F 16/29* (2019.01)
*G06F 16/951* (2019.01)
*G06F 16/9537* (2019.01)
*G06F 40/47* (2020.01)

(52) U.S. Cl.
CPC ............ *G06F 40/154* (2020.01); *G06F 16/29* (2019.01); *G06F 16/951* (2019.01); *G06F 16/9537* (2019.01); *G06F 40/47* (2020.01)

(58) Field of Classification Search
None
See application file for complete search history.

(56) References Cited

U.S. PATENT DOCUMENTS

| | | | | |
|---|---|---|---|---|
| 10,488,860 | B1 * | 11/2019 | Koch | G06F 16/9537 |
| 10,698,960 | B2 * | 6/2020 | Mehta | G06F 16/212 |
| 10,789,080 | B2 * | 9/2020 | Levy | G06F 16/958 |
| 11,238,115 | B1 * | 2/2022 | Newman | G06Q 30/0627 |
| 11,734,522 | B2 * | 8/2023 | Unni | G06N 3/08 704/2 |
| 2006/0271280 | A1 | 11/2006 | O'clair | |
| 2008/0168038 | A1 | 7/2008 | Fuchs | |
| 2009/0100342 | A1 | 4/2009 | Jakobson | |

(Continued)

*Primary Examiner* — Hosain T Alam
(74) *Attorney, Agent, or Firm* — Ashok Tankha

(57) ABSTRACT

A system and a method for automatically creating structured data objects for location-based information rendered in one or more languages in an electronic document to automatically integrate one or more locations into location applications, for example, map applications, are provided. The system identifies and transforms location-based objects associated with a location(s) of a business entity in one or more languages in the electronic document into geocoded data. The system automatically creates structured data objects for the geocoded data based on configurable criteria. The system generates a dynamic index-oriented map object (DIOMO) for the structured data objects specific to the location(s) of the business entity and connects the structured data objects to the DIOMO by creating linked data nodes from the structured data objects with the DIOMO as a core. The system automatically integrates the location(s) of the business entity into location applications using the DIOMO with the linked data nodes.

21 Claims, 10 Drawing Sheets

(56) References Cited

U.S. PATENT DOCUMENTS

| | | | | |
|---|---|---|---|---|
| 2013/0060764 | A1* | 3/2013 | Voinea | G06F 16/29<br>707/723 |
| 2017/0220546 | A1* | 8/2017 | Codrington | G06F 16/2282 |
| 2018/0165364 | A1* | 6/2018 | Mehta | G06F 16/951 |
| 2018/0211718 | A1* | 7/2018 | Heath | G16H 80/00 |
| 2019/0236165 | A1* | 8/2019 | Nickerson | G06F 16/29 |
| 2021/0117396 | A1* | 4/2021 | Iska | G06N 3/084 |
| 2021/0240786 | A1* | 8/2021 | Pendse | G06F 16/90348 |
| 2021/0248180 | A1* | 8/2021 | Mayster | G06F 16/29 |
| 2021/0312009 | A1* | 10/2021 | Omoigui | G06F 16/972 |
| 2021/0366014 | A1* | 11/2021 | Wang | G06F 21/36 |
| 2023/0325421 | A1* | 10/2023 | Kalekar | G06F 16/3337<br>704/9 |

* cited by examiner

AUTOMATED STRUCTURED DATA OBJECT CREATION AND LOCATION INTEGRATION INTO MULTIPLE LOCATION APPLICATIONS

CROSS-REFERENCE TO RELATED APPLICATIONS

This application claims priority to and the benefit of the provisional patent application titled "A Method of Creating Structured Data Objects for Integration into One or More of a Map Application, a Geofencing Application, and a Map Citation Application", application No. 63/220,996, filed in the United States Patent and Trademark Office (USPTO) on Jul. 12, 2021, the provisional patent application titled "A Method Of Dynamic Data Manipulation Of A Business Website Using An Omega Object", application No. 63/159,504, filed in the USPTO on Mar. 11, 2021, and the non-provisional patent application titled "Dynamic Website Characterization for Search Optimization", application Ser. No. 17/692,061, filed in the USPTO on Mar. 10, 2022. The specifications of the above referenced patent applications are incorporated herein by reference in their entirety.

BACKGROUND

With recent advances in technology and digital marketing, map applications, for example, Google® Maps and Waze® of Google LLC, Apple Maps of Apple, Inc., the Mapquest® web mapping platform of MapQuest, Inc., Bing® Maps of Microsoft Corporation, OpenStreetMap® of OpenStreetMap Foundation, etc., have evolved from being virtual maps to providing platforms for searching, comparing, and evaluating businesses. Some of these map applications allow users to explore local businesses, access suggested locations, search nearby businesses, and view detailed information, for example, images, ratings, reviews, etc., of the businesses to make informed decisions, and also allow businesses to connect to a large audience. Furthermore, some of these map applications assist users in finding and quickly contacting businesses, encourage users to visit business websites or physical locations of the businesses, allow businesses to display images of their products and business locations, drive marketing efforts, etc. Businesses, therefore, need to integrate their location and business information into map applications in a convenient and structured manner to increase their visibility, showcase their business, products, and services to a large audience, increase brand awareness, generate leads, and drive conversions.

High-quality links and map citations that direct users to business websites are typically used as ranking factors by map applications and improve a business' chances of topping the search list on these map applications. Map citations refer to publishing of business location information comprising, for example, business name, street address, city, state, zip code, website uniform resource locator (URL), business phone number, etc., across the web on different websites to increase rankings and visibility of a business in search results of search engines and also in map applications. These map citations are typically in the form of business listings in directories, for example, Yelp® listings of Yelp, Inc., the Foursquare® location data platform of Foursquare Labs, Inc., yahoo!® Local listings of Yahoo! Inc., etc., and other website resources that search engines use to determine the accuracy and relevance of a business' location. Multiple consistent map citations of a business in an appropriate format, for example, a text format or a structured format, assist in improving search engine rankings, that is, improving a business's chance of being displayed when a search is performed in search engines and also in map applications.

Other location-based technologies such as geofencing allow businesses to set up geographic zones, also referred to as "geofences", to collect information about users and precisely target relevant content, for example, advertisements, promotional messages, etc., to user devices when the users enter those geographic zones, to increase user engagement and conversions. When users enter these geographic zones set up by a business, the business receives location and other information about the users who opt-in for location services through a global positioning system (GPS) or through radio frequency identification (RFID), thereby allowing the business to target relevant content to the user. Geofencing is beneficial in the location-based advertising space and even allows businesses to target users engaging with their competitors. By leveraging location data of user devices, businesses can promote their products and services and the users can receive personalized content associated with the business based on their interests and needs.

Therefore, there is a need for integrating business location information in a structured manner into multiple location applications, for example, map applications, map citations, geofencing applications, etc., to improve visibility of the business and the quality and quantity of web traffic to their business websites. In recent years, a substantial percentage of web traffic is generated through the use of location applications. Location applications such as map applications incorporate search engines that collect, parse, index, and store data to facilitate convenient and fast access and retrieval of content from websites. There is a need for enhancing visibility of a business in a location application by optimally structuring its location information displayed on the business' website or on other websites through map citations. Search engine optimization ensures that the business has a high ranking and appears high on a list of search engine results in location applications. Optimization of a business' website, for example, increases brand awareness, generates leads, attracts customers, develops the business' credibility, etc. Some factors that optimize a business' website comprise, for example, inserting right metatags and headings in webpages, ensuring crawlability of the webpages, increasing comprehensibility of the webpages, internal linking, backlinks, deploying schema markup, etc. Deploying schema markup in the webpages of the website provides a search engine optimization boost to the website.

An online collaborative organization such as schema.org sponsored by Google LLC, Microsoft Corporation, Yahoo! Inc., and Yandex, Ltd., creates, maintains, and promotes schemas for structured data on the Internet and in electronic documents, for example, webpages. Structured data is data in a standardized format configured to provide information about a webpage and classify the content of the webpage. Structured data conforms to a predefined data model and has a well-defined, easily identifiable and decipherable structure. Search engines access and utilize structured data to interpret the content of a webpage. Structured data is typically stored in well-defined schemas. Schema.org provides a comprehensive list of specific categories that are used for developing schema codes for websites and for indexing websites for enhancing their rankings, driving traffic, and increasing awareness in search engines. The schema.org vocabularies are configured to be used with many different encodings, for example, the Resource Description Framework in Attributes (RDFa), Microdata, and JavaScript Object Notation for Linked Data (JSON-LD). These vocabularies cover entities and relationships between entities and actions, and can be extended through a well-documented extension model. Many applications, for example, from Google LLC, Microsoft Corporation, Pinterest, Inc., Yandex, Ltd., etc., use the schema.org vocabularies to power rich, extensible experiences. Google LLC and schema.org collaboratively provide the schema vocabularies and schema markups to improve indexing of a website.

While schema.org and structured data are supported by multiple search engines, for example, the Google® search engine of Google LLC, the Bing® search engine of Microsoft Corporation, the Yahoo® search engine of Yahoo! Inc., the Yandex® search engine of Yandex, Ltd., etc., to help websites get indexed in a more organized and efficient manner, multiple websites still do not use schema codes to markup website content. While approximately only 15% of websites searched comprise schema markups, these websites use schema codes for specific content such as recipes or movie reviews. While structured data of websites is open and available for use, the usage of the schema codes is either inadequate or there is no system that makes use of the schema codes. Schema.org-approved search engine optimization algorithms use snippets of content of a website and may ignore critical indicators related to a business that optimize the website. There is a need for generating, analyzing, and harnessing structured data for location-based information on webpages, optimally to enhance search engine optimization of websites through a wide range of location applications. Furthermore, there is a need for generating, analyzing, and harnessing structured data for location-based information rendered in different languages on webpages, optimally to enhance search engine optimization of multilanguage websites.

Hence, there is a long-felt need for a system and a method for automatically creating structured data objects for location-based information of a business entity rendered in one or more of multiple languages in an electronic document to automatically integrate one or more locations of the business entity into multiple location applications. Moreover, there is a need for a system and a method for processing location data, for example, geographic coordinates, geographic coordinate system (GCS) parameters, etc., of a location of a business entity, specifically a location-based business, and automatically creating structured data objects that fit those geographic coordinates into a wide range of location applications. Furthermore, there is a need for a system and a method for targeting schema codes that are most relevant to businesses and their websites to enhance the indexation of relevant location-based information and to maximize web traffic potential.

SUMMARY

This summary is provided to introduce a selection of concepts in a simplified form that are further disclosed in the detailed description. This summary is not intended to determine the scope of the claimed subject matter.

The system and the method disclosed herein address the above-recited need for automatically creating structured data objects for location-based information of a business entity rendered in one or more of multiple languages in an electronic document to automatically integrate one or more locations of the business entity into multiple location applications. The electronic document is, for example, a website, a webpage of a website, etc. The location applications comprise, for example, map applications, map citations, geofencing applications, navigation applications implemented using satellite-based positioning, navigation, and timing systems of different types, etc. The satellite-based positioning, navigation, and timing systems of different types constitute a global navigation satellite system (GNSS) comprising, for example, a global position system (GPS), a geospatial positioning system, a celestial coordinate system, etc. Moreover, the system and the method disclosed herein address the need for processing location data, for example, geographic coordinates, geographic coordinate system (GCS) parameters, etc., of a location of a business entity, specifically a location-based business, and automatically creating structured data objects that fit those geographic coordinates, parameters, etc., into a wide range of location applications. The system and the method disclosed herein connect a virtual space to a physical space by using a dynamic index-oriented map object configured to define points and locations throughout the internet. Furthermore, the system and the method disclosed herein address the need for targeting schema codes that are most relevant to businesses and their websites to enhance the indexation of relevant location-based information and to maximize web traffic potential. The system and the method disclosed herein enhance visibility of a business in a location application by optimally structuring its location information displayed on the business' website or on other websites through map citations. The system and the method disclosed herein provide a set of guidelines to identify what to code, where to code, how to code, and how to ensure the code works on the website of the business entity to improve its indexation by search engines and its listings in search results. The system and the method disclosed herein automatically generate, analyze, and harness structured data for location-based information on webpages, optimally to enhance search engine optimization of websites through a wide range of location applications. Furthermore, the system and the method disclosed herein generate, analyze, and harness structured data for location-based information rendered in different languages on webpages, optimally to enhance search engine optimization of multilanguage websites.

The system and the method disclosed herein employ an automated object creation and location integration engine (AOCLIE) defining computer program instructions executable by at least one processor for automatically creating structured data objects for location-based information of a business entity rendered in one or more of multiple languages in an electronic document to automatically integrate one or more locations of the business entity into multiple location applications. The AOCLIE accesses an electronic document of the business entity using an identifier, for example, a uniform resource locator (URL) of the electronic document. The AOCLIE identifies location-based objects associated with one or more locations of the business entity in one or more of multiple languages, for example, natural languages such as English, Mandarin, Hindi, French, German, Spanish, Italian, Turkish, etc., in the electronic document. The location-based objects comprise, for example, geographic coordinates, address information, a location name, etc., and any combination thereof, in one or more of multiple languages. The AOCLIE transforms the identified location-based objects into geocoded data. The geocoded data comprises, for example, geographic coordinate system (GCS) parameters, global positioning system (GPS) parameters, geospatial positioning parameters, celestial coordinate system parameters, global navigation satellite system (GNSS) parameters, etc.

The automated object creation and location integration engine (AOCLIE) automatically creates structured data objects for the geocoded data based on configurable criteria. The configurable criteria comprise, for example, templates, content derived from the electronic document in one or more of multiple languages, structured data markup schemas, best practices associated with schemas to suit multiple linked data object categories, etc., and any combination thereof. In an embodiment, the AOCLIE automatically creates the structured data objects using an artificial intelligence (AI)-based transformation of the geocoded data. In an embodiment, the AOCLIE stores the created structured data objects in an object database. The AOCLIE generates a dynamic index-oriented map object for the created structured data objects specific to the location(s) business entity. The AOCLIE connects the created structured data objects to the dynamic index-oriented map object by creating linked data nodes from the created structured data objects with the dynamic index-oriented map object as a core. In an embodiment, the linked data nodes of the dynamic index-oriented map object are JavaScript Object Notation for Linked Data (JSON-LD) nodes. In another embodiment, the linked data nodes of the dynamic index-oriented map object are Microdata nodes. In another embodiment, the linked data nodes of the dynamic index-oriented map object are Resource Description Framework in Attributes (RDFa) nodes. The AOCLIE automatically integrates the location(s) of the business entity into one or more of a wide range of location applications using the dynamic index-oriented map object with the linked data nodes. In an embodiment, the AOCLIE uses an application programming interface (API) key to automatically integrate the location(s) of the business entity into one or more of a wide range of location applications through the dynamic index-oriented map object with the linked data nodes.

In an embodiment, the automated object creation and location integration engine (AOCLIE) connects the dynamic index-oriented map object with the linked data nodes to the electronic document, thereby facilitating dynamic changes to the electronic document and dynamically optimizing the electronic document. The AOCLIE connects the dynamic index-oriented map object with the linked data nodes to the electronic document, for example, using an application programming interface (API) key. In an embodiment, the dynamic changes to the electronic document are facilitated free of recreation of the structured data objects using the created linked data nodes of the dynamic index-oriented map object. In an embodiment, in response to a search query, the AOCLIE fits one or more of the linked data nodes of the dynamic index-oriented map object to the search query.

In one or more embodiments, related systems comprise circuitry and/or programming for executing the methods disclosed herein. The circuitry and/or programming are of any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments are shown in the drawings. However, the embodiments herein are not limited to the specific components, modules, and methods disclosed herein. The description of a component, or a module, or a method step referenced by a numeral in a drawing is applicable to the description of that component, or that module, or that method step shown by that same numeral in any subsequent drawing herein.

DETAILED DESCRIPTION

Various aspects of the disclosure herein are embodied as a system, a method, or a non-transitory, computer-readable storage medium having one or more computer-readable program codes stored thereon. Accordingly, various embodiments of the disclosure herein take the form of an entirely hardware embodiment, an entirely software embodiment comprising, for example, microcode, firmware, software, etc., or an embodiment combining software and hardware aspects that are referred to herein as a "system", a "module", an "engine", a "circuit", or a "unit".

Figure 1:
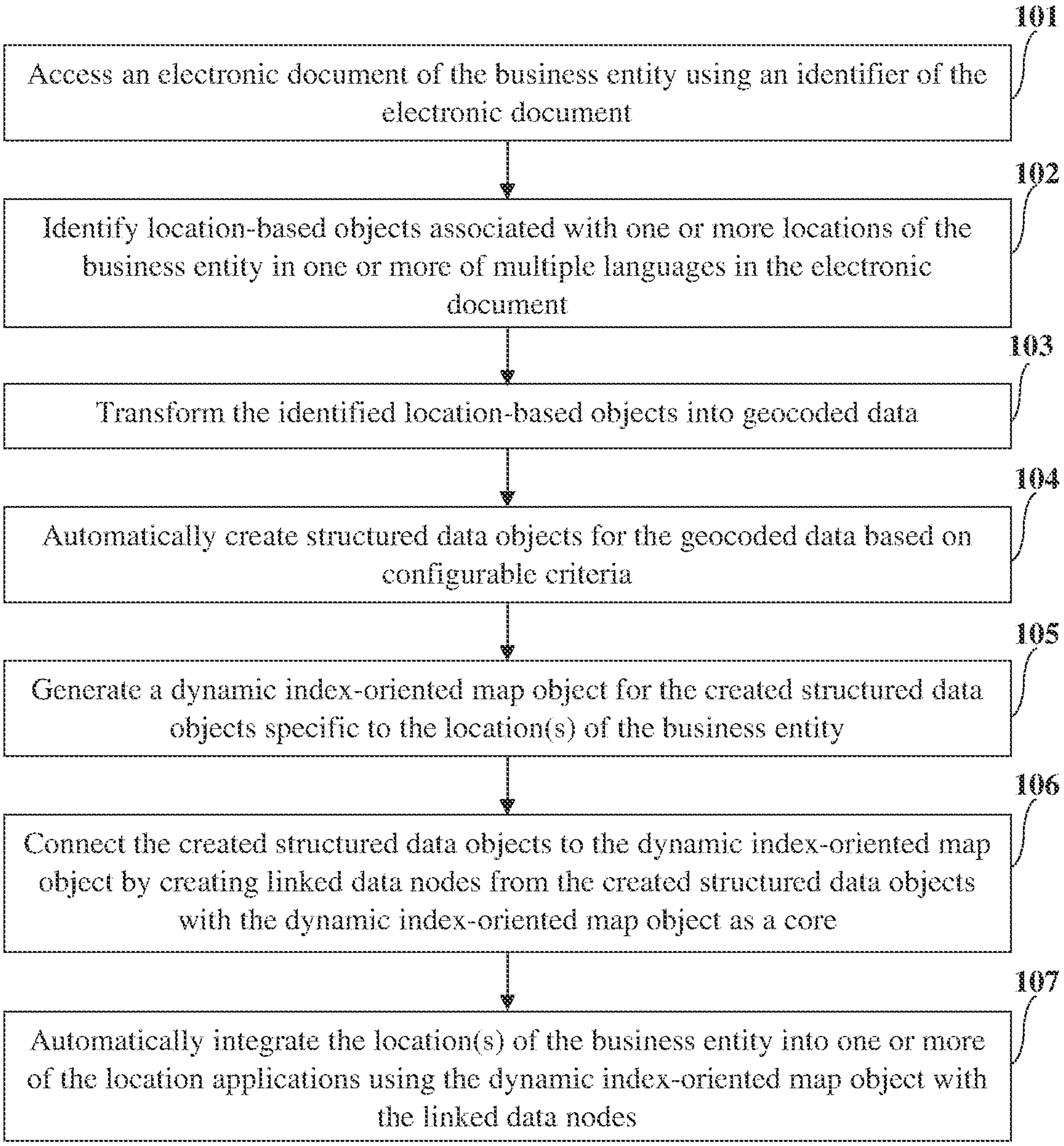
FIG. 1 illustrates a flowchart of an embodiment of a method for automatically creating structured data objects for location-based information of a business entity rendered in one or more of multiple languages in an electronic document to automatically integrate one or more locations of the business entity into multiple location applications.

FIG. 1 illustrates a flowchart of an embodiment of a method for automatically creating structured data objects for location-based information of a business entity rendered in one or more of multiple languages in an electronic document to automatically integrate one or more locations of the business entity into multiple location applications. As used herein, "structured data object" refers to a data structure or a container constructed as an aggregate of data elements, for example, data values that are stored and retrievable, relationships between the data values, and functions that operate on the data values. Also, as used herein, "business entity" refers to an individual or an organization engaged in a business and requires a search engine optimization boost to a website associated with the business to increase visibility of the business and web traffic potential of the website. Also, as used herein, "electronic document" refers to a collection of data and content comprising, for example, textual content, image content, audio content, video content, audiovisual content, multimedia content, etc., and any combination thereof, in an electronic format. The electronic document is, for example, a website such as a business website, a webpage of a website such as a personal page, a sports team page, an electronic commerce (ecommerce) webpage, a news page, etc. For purposes of illustration, the disclosure herein refers to the electronic document being a website or a webpage of a website; however, the scope of the system and the method disclosed herein is not limited to the electronic document being a website or a webpage of a website, but extends to include other electronic documents, for example, electronic mail (email), messages, and other functionally equivalent structures that require automatic creation of structured data objects and dynamic optimization.

In the method disclosed herein, an electronic document comprising content, for example, textual content, video content, audio content, animation content, multimedia content, etc., and any combination thereof, in one or more of multiple languages is processed for automatically creating structured data objects for location-based information of a business entity to automatically integrate one or more locations of the business entity into multiple location applications. In an embodiment, the electronic document is an electronic document comprising content in a single language, for example, any one natural language such as English, Mandarin, Hindi, French, German, Spanish, Italian, Turkish, etc. In another embodiment, the electronic document is a multilanguage electronic document comprising content in two or more languages, for example, natural languages such as English, Mandarin, Hindi, French, German, Spanish, Italian, Turkish, etc. The location applications comprise, for example, map applications such as Google® Maps and Waze® of Google LLC, Apple Maps of Apple, Inc., the Mapquest® web mapping platform of MapQuest, Inc., Bing® Maps of Microsoft Corporation, OpenStreetMap® of OpenStreetMap Foundation, etc., map citations, geofencing applications, navigation applications implemented using satellite-based positioning, navigation, and timing systems of different types, etc. The satellite-based positioning, navigation, and timing systems of different types constitute a global navigation satellite system (GNSS) comprising, for example, a global position system (GPS), a geospatial positioning system, a celestial coordinate system, etc.

The method disclosed herein employs an automated object creation and location integration engine (AOCLIE) defining computer program instructions executable by at least one processor for automatically creating structured data objects for location-based information of a business entity rendered in one or more of multiple languages in an electronic document to automatically integrate one or more locations of the business entity into multiple location applications. In an embodiment, the AOCLIE is implemented as a web-based platform hosted on a server or a network of servers accessible via a network, for example, the internet, satellite internet, a wireless network, a mobile telecommunication network, etc. In another embodiment, the AOCLIE is implemented in a cloud computing environment. As used herein, "cloud computing environment" refers to a processing environment comprising configurable computing physical and logical resources, for example, networks, servers, storage media, virtual machines, applications, services, etc., and data distributed over a network. The cloud computing environment provides on-demand network access to a shared pool of the configurable computing physical and logical resources. In another embodiment, the AOCLIE comprises a software application downloadable and usable on a user device, for example, a personal computer, a tablet computing device, a mobile computer, a mobile phone, a smartphone, a laptop, a wearable device such as smart glasses, smart watches, etc., a client device, a network-enabled computing device, etc., and configured to perform functions of the AOCLIE.

The automated object creation and location integration engine (AOCLIE) accesses 101 an electronic document of the business entity using an identifier, for example, a uniform resource locator (URL) of the electronic document. In an embodiment, the AOCLIE renders a user interface comprising, for example, a search bar, for receiving the URL of a website of the business entity that needs to be optimized. Using the URL, the AOCLIE retrieves the electronic document, for example, from an input data source of the business entity. The electronic document comprises textual objects and the non-textual objects. As used herein, "textual objects" refer to data objects comprising textual content of an element or an attribute, defined by character strings comprising, for example, letters, numerical characters, special characters, etc. The textual content comprises, for example, individual characters, words, sentences, paragraphs, etc., rendered in the electronic document. In an embodiment, location-based information comprising, for example, an address, a location name, a zip code, a business name, a phone number, etc., is part of the textual content in the electronic document. Also, as used herein, "non-textual objects" refer to data objects comprising non-textual content, for example, graphics, icons, still images, moving images, sounds, and other forms of visual, audible, and tactile content that is rendered in lieu of or to complement textual content in an electronic document.

The automated object creation and location integration engine (AOCLIE) identifies 102 location-based objects associated with one or more locations of the business entity in one or more of multiple languages, for example, natural languages such as English, Mandarin, Hindi, French, German, Spanish, Italian, Turkish, etc., in the electronic document. The location-based objects comprise, for example, geographic coordinates, address information, a location name, etc., and any combination thereof, in one or more of multiple languages. The AOCLIE scrolls the electronic document to identify the location-based objects. The AOCLIE performs data scraping on the electronic document and identifies tags, for example, a tags, p tags, map tags, etc., related to the location-based objects as disclosed in the description of FIG. 5. In an embodiment, the AOCLIE employs different technologies, for example, artificial intelligence (AI), machine learning, fuzzy logic, and data science in various algorithms to analyze the electronic document and identify the location-based objects rendered in one or more languages. The AOCLIE transforms 103 the identified location-based objects into geocoded data. The geocoded data comprises, for example, geographic coordinate system (GCS) parameters, global positioning system (GPS) parameters, geospatial positioning parameters, celestial coordinate system parameters, global navigation satellite system (GNSS) parameters, etc. The AOCLIE derives the geocoded data comprising, for example, geographic coordinates, geographic parameters, etc., by geocoding the identified location-based objects. In an embodiment, the AOCLIE performs geocoding by converting an address, for example, 403 Commerce Lane, West Berlin, NJ, identified in the electronic document into geographic coordinates, for example, latitude 39.810697 and longitude−74.930228, which are used to place markers on a map of a wide range of location applications. In another embodiment, if the AOCLIE identifies geographic coordinates in the electronic document, the AOCLIE performs reverse geocoding. The AOCLIE performs reverse geocoding by converting the geographic coordinates, for example, latitude 39.810697 and longitude−74.930228, into a human-readable address, for example, 403 Commerce Lane, West Berlin, NJ.

In an embodiment, if the identified location-based objects are rendered in a natural language other than English, the automated object creation and location integration engine (AOCLIE) translates the identified location-based objects into English by executing translation algorithms similar to or the same as those of Google Translate of Google, Inc., the BabelFish™ translator of The Babel Fish Corporation, etc., and then proceeds to transform the identified location-based objects into geocoded data. In another embodiment, the AOCLIE transforms the identified location-based objects into geocoded data without translating the identified location-based objects from one natural language to another natural language, and directly recognizes the language of the identified location-based objects and proceeds to transform the identified location-based objects into geocoded data.

The automated object creation and location integration engine (AOCLIE) automatically creates 104 structured data objects for the geocoded data based on configurable criteria. The configurable criteria comprise, for example, templates, content derived from the electronic document in one or more of multiple languages, structured data markup schemas, best practices associated with schemas to suit multiple linked data object categories, etc., and any combination thereof. The AOCLIE analyzes the geocoded data and automatically creates structured data objects therefor using templates and best practices from a collaborative schema data source, for example, schema.org, to suit multiple object categories such as JavaScript Object Notation for Linked Data (JSON-LD) object categories. As used herein, "collaborative schema data source" refers to a data source that collaboratively collects and maintains multiple schema codes that improve search engine optimization of an electronic document, for example, a website. An example of a collaborative schema data source is schema.org sponsored by Google LLC, Microsoft Corporation, Yahoo! Inc., and Yandex, Ltd. Although the detailed description refers to "schema.org" being used as the collaborative schema data source, the scope of the system and the method disclosed herein is not limited to "schema.org" being used as the collaborative schema data source, but extends to include any other collaborative schema data source that collaboratively collects and maintains multiple schema codes that can be used for search engine optimization of an electronic document. In an example, the AOCLIE, in operable communication with the collaborative schema data source that maintains multiple schema codes for different objects, transforms the geocoded data into structured data objects. The AOCLIE transforms the geocoded data into structured data objects by coding the geocoded data with optimal schema codes that are determined as disclosed in Applicant's patent titled "Content Validation and Coding for Search Engine Optimization" with application Ser. No. 15/834,228, issued as patent number U.S. Pat. No. 10,698,960, which is incorporated herein by reference in its entirety. As used herein, "optimal schema codes" refer to schema codes or code snippets that the AOCLIE determines are relevant for automatic creation of the structured data objects.

In an embodiment, the automated object creation and location integration engine (AOCLIE) automatically creates the structured data objects using an artificial intelligence (AI)-based transformation of the geocoded data. In an embodiment, the input data, for example, the URL inputted via the user interface rendered by the AOCLIE, is transformed, processed, and executed by a heuristically-based coded algorithm in the AOCLIE for automatically creating structured data objects for the geocoded data. In an embodiment, the URL of the website is transformed by the heuristically-based coded algorithm as follows: The AOCLIE receives the URL and generates a robot.txt file that instructs a web crawler to crawl the electronic document and content related to the electronic document from one or a combination of one or more search engines and/or media platforms. The AOCLIE utilizes the instructions provided by the robot.txt file to allow the web crawler to visit the URL and collect the available content at the visited URL. The AOCLIE implements application programming interface (API) key integration to access search engines and media platforms to collect the content related to the visited URL.

The automated object creation and location integration engine (AOCLIE) combines the collected content together into a document and compares the content to functions of the heuristically-based coded algorithm for coding, automatic creation of structured data objects, and dynamic optimization of the electronic document, thereby transforming the received URL into an optimally coded electronic document. As used herein, "coding" refers to applying schema codes to the geocoded data and other relevant content in an electronic document. The AOCLIE applies schema codes to the geocoded data and other relevant content in an electronic document using different encodings, for example, a JavaScript Object Notation for Linked Data (JSON-LD) encoding, a Resource Description Framework in Attributes (RDFa) encoding, a Microdata encoding, etc. The schema codes comprise structured data tags in a markup language code, for example, a hypertext markup language (HTML) code, a JavaScript Object Notation (JSON) code, an extensible markup language (XML) code, an extensible hypertext markup language (XHTML) code, etc. As used herein, "structured data tags" refer to on-page markup that allows search engines to understand the content of the electronic document, and use the content to improve a search result listing. The structured data pairs a name with a value. The structured data tags are, for example, markup language tags such as HTML tags, JSON-LD tags, etc., that can be added to an electronic document, for example, a website, to allow the search engines to categorize and index the content of the electronic document optimally. An example schema code applied to content of a website of a business entity using a JSON-LD encoding in an HTML script tag is disclosed below.

```
//JSON Example
<script type="application/ld+json">
{
"@context": "https://schema.org",
"@type": "Organization",
"address": {
"@type": "PostalAddress",
"addressLocality": "NJ, United States",
"postalCode": "08091",
"streetAddress": "403 Commerce Ln Suite 5, West Berlin"
},
"email": "info@metasensemarketing.com",
"member": [
```

-continued

```
{
“@type”: “Organization”
},
{
“@type”: “Organization”
}
],
“alumni”: [
{
“@type”: “Person”,
“name”: “Jatin V Mehta”
}
],
“name”: “MetaSense Marketing Management Inc.”,
“telephone”: “866-875-META (6382)”
}
</script>
```

An example schema code applied to content of a website of a business entity using a Microdata encoding embedded in HTML is disclosed below.

```
//Microdata Example
<div itemscopeitemtype=“https://schema.org/Organization”>
<span itemprop=“name”>MetaSense Marketing Management Inc.</span>
Contact Details:
<div itemprop=“address” itemscopeitemtype=“https://schema.org/PostalAddress”>
Main address:
<span itemprop=“streetAddress”>403 Commerce Ln Suite 5, West Berlin</span>
<span itemprop=“postalCode”>08091</span>
<span itemprop=“addressLocality”>NJ, United States</span>
</div>
Tel:<span itemprop=“telephone”>866-875-META (6382)</span>,
E-mail: <span itemprop=“email”>info@metasensemarketing.com</span>
<span itemprop=“alumni” itemscopeitemtype=“https://schema.org/Person”>
<span itemprop=“name”>Jatin V Mehta</span>
</span>,
History: We are a full-service digital marketing agency SEO company in New Jersey &
Philadelphia that takes pride in creating successful, comprehensive marketing plans and is
the only company in the world to offer the patented iMetaDex ™ technology.
</div>
```

An example schema code applied to content of a website of a business entity using a Resource Description Framework in Attributes (RDFa) is disclosed below.

```
//RDFa Example
<div vocab=“https://schema.org/” typeof=“Organization”>
<span property=“name”>MetaSense Marketing Management Inc.</span>
Contact Details:
<div property=“address” typeof=“PostalAddress”>
Main address:
<span property=“streetAddress”>403 Commerce Ln Suite 5, West Berlin</span>
<span property=“postalCode”>08091</span>
<span property=“addressLocality”>NJ, United States</span>
</div>
Tel:<span property=“telephone”>866-875-META (6382)</span>,
E-mail: <span property=“email”>info@metasensemarketing.com</span>
<span property=“alumni” typeof=“Person”>
<span property=“name”>Jatin V Mehta</span>
</span>
History: We are a full-service digital marketing agency SEO company in New Jersey &
Philadelphia that takes pride in creating successful, comprehensive marketing plans and is
the only company in the world to offer the patented iMetaDex ™ technology.
</div>
```

In various embodiments, the method disclosed herein utilizes artificial intelligence (AI), machine learning, a big data architecture framework, a geographic information system (GIS) framework, and different technology tools comprising, for example, the IBM Watson® cognitive technology tool of International Business Machines Corporation (IBM Corp) for coding the content of an electronic document for search engine optimization through the automatic creation of structured data objects and dynamic optimization of the electronic document. In various embodiments, the automated object creation and location integration engine (AOCLIE) executes different AI tools for performing various analyses disclosed above and below and for coding the content of the electronic document for search engine optimization through the automatic creation of structured data objects and dynamic optimization of the electronic document.

In an embodiment, the automated object creation and location integration engine (AOCLIE) stores the created structured data objects in an object database. In an embodiment, the AOCLIE processes the geocoded data, for example, geographic coordinates, of a location of a business entity, specifically a location-based business, and automatically creates structured data objects that fit those geographic coordinates into a wide range of location applications. The structured data objects comprise coding that assists search engines in indexing the electronic document, for example, a website, fast and optimally displaying website listings in the results of the search engines. In an embodiment, the structured data objects are configured, for example, with hypertext markup language (HTML) markups or JavaScript Object Notation (JSON) markups that can be integrated into the electronic document for coding the electronic document. The structured data objects align with a format of a database that follows rules and structure to allow the search engines to scan the electronic document quickly and effectively.

In an embodiment, the automated object creation and location integration engine (AOCLIE) processes the geocoded data as textual objects and transforms the textual objects into structured data objects, for example, in accordance with schemas provided by a collaborative schema data source or a third party organization with which multiple search engines comply, using artificial intelligence (AI)-based technology as disclosed in Applicant's patent titled "Content Validation and Coding for Search Engine Optimization" with application Ser. No. 15/834,228, issued as patent number U.S. Pat. No. 10,698,960, which is incorporated herein by reference in its entirety. In an embodiment, the AOCLIE executes AI-based detection tools such as those utilized by search engines and media platforms, for example, the Google® search engine of Google LLC, the Bing® search engine of Microsoft Corporation, the Facebook® social media and networking platform of Facebook, Inc., the Instagram® photo and video sharing social networking platform of Instagram, LLC, etc., for identifying the location-based objects rendered in one or more languages in the electronic document; transforming the location-based objects into geocoded data; determining optimal schema codes for the geocoded data by analyzing the location-based objects with reference to a collaborative schema data source such as schema.org; and automatically creating structured data objects for the geocoded data by applying the determined optimal schema codes to the geocoded data. The AOCLIE outputs the structured data objects that optimally describe the website of the business entity and increase the interpretation and comprehensibility of the website by web resources, for example, search engines. The AOCLIE generates, analyzes, and harnesses structured data for multilanguage content of different types and combinations comprising, for example, location-based information of the business entity, on electronic documents, optimally to enhance search engine optimization of multilanguage electronic documents. A generic computer using a generic program cannot identify location-based objects associated with one or more locations of the business entity in a multilanguage electronic document, transform the identified location-based objects into geocoded data, and automatically create structured data objects for the geocoded data based on configurable criteria in accordance with the method steps disclosed above.

The automated object creation and location integration engine (AOCLIE) generates 105 a dynamic index-oriented map object for the created structured data objects specific to one or more locations of the business entity. The generation of the dynamic index-oriented map object is similar to the generation of the dynamic index-oriented object disclosed in Applicant's non-provisional patent application titled "Dynamic Website Characterization for Search Optimization", application Ser. No. 17/692,061, which is incorporated herein by reference in its entirety. The AOCLIE determines where the structured data objects fit in the electronic document, for example, a website, and then generates the dynamic index-oriented map object. In an embodiment, the AOCLIE dynamically assigns the structured data objects to a group in the form of the dynamic index-oriented map object. In an embodiment, the dynamic index-oriented map object configures the structured data objects based on requirements of the business entity's electronic document to be read by the location applications and other web resources, for example, search engines, social networks, databases such as JavaScript Object Notation (JSON) databases, etc. The AOCLIE connects 106 the created structured data objects to the dynamic index-oriented map object by creating linked data nodes from the created structured data objects with the dynamic index-oriented map object as a core. The AOCLIE, therefore, evolves the structured data objects into the dynamic index-oriented map object. In an embodiment, the linked data nodes of the dynamic index-oriented map object are JavaScript Object Notation for Linked Data (JSON-LD) nodes. In another embodiment, the linked data nodes of the dynamic index-oriented map object are Microdata nodes. In another embodiment, the linked data nodes of the dynamic index-oriented map object are Resource Description Framework in Attributes (RDFa) nodes.

Consider an example for automatically creating structured data objects for location-based information of a business entity herein referred to as an "organization". An example representation of structured location-based information of the business entity in a standard text-based format such as a JavaScript Object Notation (JSON) format based on JavaScript object syntax is disclosed below.

```
//JSON Example
<script type="application/ld+json">
{
"@context": "https://schema.org",
"@type": "Organization",
"address": {
"@type": "PostalAddress",
"addressLocality": "NJ, United States"
"postalCode": "08091",
"streetAddress": "403 Commerce Ln Suite 5, West Berlin"
},
"email": "info@metasensemarketing.com",
```

-continued

```
"member": [
{
"@type": "Organization"
},
{
"@type": "Organization"
}
],
"alumni": [
{
"@type": "Person",
"name": "Jatin V Mehta"
}
],
"name": "MetaSense Marketing Management Inc.",
"telephone": "866-875-META (6382)"
}
</script>
```

The above schema code is applied to website content rendered in the English language. In an embodiment, if the website content is rendered in a different language, for example, Hindi, Spanish, Italian, Turkish, etc., the automated object creation and location integration engine (AOCLIE) detaches the language using an artificial intelligence tool and converts the entire schema code above into the specific language of the web site content. In this example, the AOCLIE identifies the location-based objects, for example, address information, location name, etc.; transforms the location-based objects into geocoded data, for example, geographic coordinates of a selected positioning ecosystem; automatically creates structured data objects for the geocoded data; generates a dynamic index-oriented map object for the created structured data objects; and connects the created structured data objects to the dynamic index-oriented map object by creating linked data nodes from the created structured data objects with the dynamic index-oriented map object as a core as disclosed in the code snippet below:

```
//Map Example
<script type="application/ld+json">
{
"@context": "https://schema.org/",
"@type": "Map",
"name": "MetaSense Marketing Management Inc.",
"hasMap": {
"@type": "Map",
"mapType": { "@id": "https://schema.org/VenueMap" },
"url": "https://www.metasensemarketing.com/"
}
}
</script>
<script type="application/ld+json">
{
"@context": "https://schema.org",
"@type": "Place",
"geo": {
"@type": "GeoCoordinates",
"latitude": "40.75",
"longitude": "73.98"
},
"name": "MetaSense Marketing Management Inc."
}
</script>
```

The dynamic index-oriented map object contains all the pertinent geographic location information needed for a full range of location applications. In another embodiment, the automated object creation and location integration engine (AOCLIE) implements blockchain technology and protocols that utilize JavaScript Object Notation for Linked Data (JSON-LD) for executing the various analyses disclosed above and below in a secure, shared, and decentralized environment, and thereafter connecting the created structured data objects to a multidimensional object herein referred to as the dynamic index-oriented map object. The AOCLIE automatically integrates 107 one or more locations of the business entity into one or more of a wide range of location applications using the dynamic index-oriented map object with the linked data nodes. In an embodiment, the AOCLIE automatically integrates location-based information into one or more location applications by location. In another embodiment, the AOCLIE automatically integrates location-based information into one or more location applications using the linked data nodes, for example, the JSON-LD nodes of the dynamic index-oriented map object disclosed above. In an embodiment, the AOCLIE utilizes an application programming interface (API) key for automatically integrating one or more locations of the business entity into one or more of a wide range of location applications through the dynamic index-oriented map object with the linked data nodes.

In an embodiment, the automated object creation and location integration engine (AOCLIE) connects the dynamic index-oriented map object with the linked data nodes to the electronic document, thereby facilitating dynamic changes to the electronic document and dynamically optimizing the electronic document. As used herein, "dynamic changes" refers to automatic addition of the dynamic index-oriented map object with the linked data nodes to the electronic document by the AOCLIE after processing, analysis, and creation of structured data objects for the location-based information of the electronic document in the connected framework formed between the AOCLIE and the electronic document. In an embodiment, the dynamic changes comprise automatic addition of new linked data nodes associated with new content to the dynamic index-oriented object, and in turn, to the electronic document in the connected framework formed between the AOCLIE and the electronic document. The AOCLIE connects the dynamic index-oriented map object with the linked data nodes to the electronic document, for example, using an application programming interface (API) key. In an embodiment, the dynamic changes to the electronic document are facilitated free of recreation of the structured data objects using the created linked data nodes of the dynamic index-oriented map object. Through the connected framework, the AOCLIE dynamically incorporates changes into the electronic document, without manual user intervention from the business entity.

Using the dynamic index-oriented map object with the linked data nodes, in an embodiment, the automated object creation and location integration engine (AOCLIE) integrates map citations and geocoded data into the script of the electronic document. When a search engine crawls the optimized electronic document, the dynamic index-oriented map object with the linked data nodes renders the location-based information of the business entity, for example, a map uniform resource locator (URL), latitude, longitude, etc., to the search engine for improving search results. In an embodiment, the AOCLIE integrates the linked data nodes, for example, JSON-LD nodes, with the dynamic index-oriented map object at their core into various location applications, for example, mapping, geofencing, map citation applications, etc., using an application programming interface (API) key. Integration of a business location into location applications such as map applications increases visibility of the business entity, generates enhanced insights from analytics, allows convenient usage of location in search algorithms, boosts local search engine optimization, improves communication with customers of interest, optimizes various online search profiles of the business entity, improves business descriptions and service field descriptions, improves search results, etc. Integration of a business location into map citations improves productivity, improves search ranking maintainability, directs search engines to read listings of the business entity, improves presentation of the business entity on the web, etc.

The automated object creation and location integration engine (AOCLIE) facilitates dynamic changes to the electronic document without recreating the structured data objects by using a connection of the linked data nodes, for example, the JSON-LD nodes, the Microdata nodes, the RDFa nodes, etc., with the dynamic index-oriented map object at their core to the website. When new content, for example, new video content, audio content, etc., and other content is added to a website, the AOCLIE automatically re-analyzes the website, detects the presence of the video content, audio content, etc., generates textual objects therefrom, transforms the generated textual objects into structured data objects by applying optimal schema codes to the generated textual objects, and connects these additional structured data objects to the dynamic index-oriented map object assigned to the business entity, as additional linked data nodes. The dynamic index-oriented map object acts as a main profile for the business entity, which is dynamically updated as new media content and other content is added to the website. For example, while a website previously contained structured data objects as linked data nodes for content such as “Article” and “Small Business”, the AOCLIE updates the website to contain structured data objects as linked data nodes for the newly added media content. The AOCLIE, therefore, creates a dynamic electronic document, for example, a dynamic website, with the dynamic index-oriented map object and its linked data nodes therein changing the manner in which the dynamic website is crawled and indexed. The AOCLIE renders the linked data nodes to a search engine based on relevance of structured data tags defined in the linked data nodes. The AOCLIE ensures that the website is optimally indexed at all times in response to a search query on a search engine, a social network, etc., or in response to a database query.

The automated object creation and location integration engine (AOCLIE) utilizes the platform(s) created by the search engine(s) and the collaborative schema data source(s), for example, schema.org, to generate an enhanced, more relevant object, that is, the dynamic index-oriented map object, depending on search intent. The AOCLIE facilitates the generation of this dynamic index-oriented map object by establishing a connection between the object database maintained by the AOCLIE and the website of the business entity. In an embodiment, the AOCLIE implements an application programming interface (API) connection or a secure connection through a blockchain in a decentralized environment to establish the connection between the object database and the website of the business entity.

In an embodiment, in response to a search query, the automated object creation and location integration engine (AOCLIE) fits one or more of the linked data nodes of the dynamic index-oriented map object to the search query. The AOCLIE detects the search query, by using one or more detection tools in operable communication with search engines and media platforms, for example, the Google® search engine of Google LLC, the Bing® search engine of Microsoft Corporation, the Facebook® social media and networking platform of Facebook, Inc., the Instagram® photo and video sharing social networking platform of Instagram, LLC, the Twitter® microblogging and social networking platform of Twitter, Inc., the Amazon® electronic commerce (ecommerce) platform of Amazon Technologies, Inc., etc., and fits one or more of the linked data nodes of the dynamic index-oriented map object to the search query using artificial intelligence. In an embodiment, the AOCLIE utilizes weblogs or a tool that recognizes the search query made to arrive on a webpage and then rotates the dynamic index-oriented map object to render the best possible linked data node to fit the search query. When the AOCLIE receives search queries using an identified internet protocol (IP) address from a social media platform, the AOCLIE recognizes the search queries as social media queries and the dynamic index-oriented map object traverses a social media object path. The AOCLIE determines the platform, for example, a search engine, a social media platform, etc., from where a search query is made; determines the language of the search query and the social media category such as a query search from a social media platform; and implements the dynamic index-oriented map object based on the social media platform and the social media category to fit the best possible linked data node to the search query. For example, if the AOCLIE determines that a search query is made on the Facebook® social media and networking platform, the AOCLIE incorporates a Facebook® schema implementation in the dynamic index-oriented map object, which pushes the best possible linked data node to fit the search query on the Facebook® social media and networking platform. The dynamic electronic document, for example, the dynamic website of the business entity, rendered by the AOCLIE provides more indexable and recognizable data to any searches performed by users on search engines and media platforms, without having to manually maintain the code, line by line. The AOCLIE follows protocols for sharing structured data, and automatically updates the website to fit search intent better.

The automated object creation and location integration engine (AOCLIE) connects a virtual space to a physical space by using the dynamic index-oriented map object configured to define points and locations throughout the internet. In an embodiment, the AOCLIE targets schema codes that are most relevant to businesses and their websites to enhance the indexation of relevant location-based information and to maximize web traffic potential. The AOCLIE, therefore, creates structured data objects for location-based information in the website of the business entity, and dynamically optimizes the website for enhanced indexation by search engines and improved listings in search results, while automatically integrating one or more locations of the business entity into multiple location applications. The AOCLIE aids in enhancing visibility of the website in results provided by search engines to maximize the number of visitors viewing the website. Using the dynamic index-oriented map object with the linked data nodes, the AOCLIE integrates location and business information into location applications in a convenient and structured manner to increase their visibility, improve the quality and quantity of web traffic to their business websites, showcase their business, products, and services to a large audience, increase brand awareness, generate leads, and drive conversions.

Figure 2:
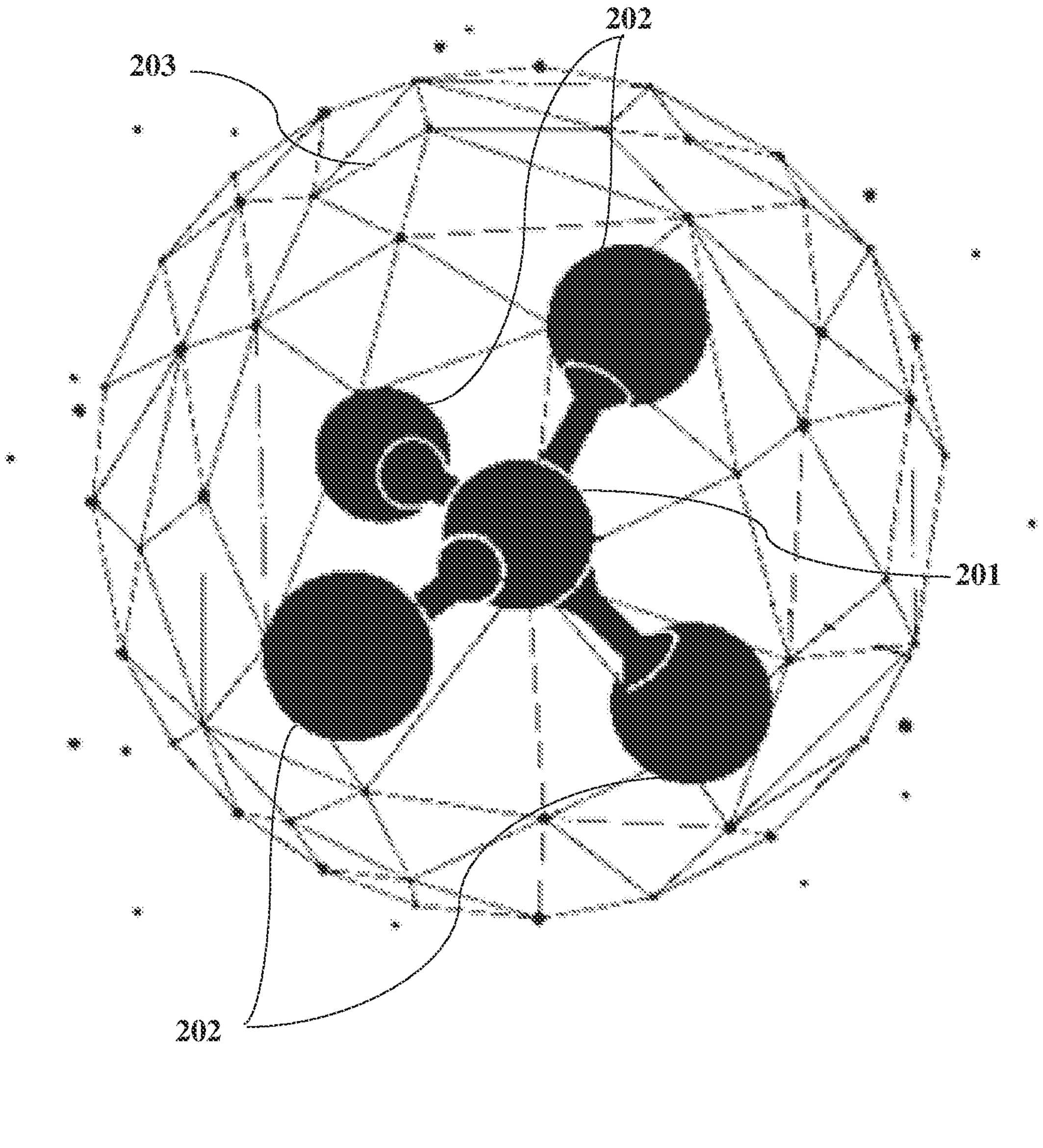
FIG. 2 exemplarily illustrates a schematic of a dynamic index-oriented map object generated by an automated object creation and location integration engine for structured data objects specific to one or more locations of a business entity.

FIG. 2 exemplarily illustrates a schematic of a dynamic index-oriented map object 201 generated by the automated object creation and location integration engine (AOCLIE) for structured data objects specific to one or more locations of a business entity. After transforming the location-based objects identified in an electronic document, for example, a website of the business entity or a webpage of the website, into geocoded data and automatically creating structured data objects for the geocoded data, the AOCLIE generates a dynamic index-oriented map object 201 for the structured data objects specific to the location(s) of the business entity as disclosed in the description of FIG. 1. The AOCLIE connects the structured data objects to the dynamic index-oriented map object 201 by creating linked data nodes 202, for example, JavaScript Object Notation for Linked Data (JSON-LD) nodes, from the structured data objects with the dynamic index-oriented map object 201 as a core as exemplarily illustrated in FIG. 2 and as disclosed in Applicant's non-provisional patent application titled "Dynamic Website Characterization for Search Optimization", application Ser. No. 17/692,061, which is incorporated herein by reference in its entirety. The AOCLIE creates the linked data nodes 202 based on the analysis and pre-built templates that adhere to standards defined, for example, by schema.org and search engine providers such as Google LLC, Microsoft Corporation, Yahoo! Inc., Yandex, Ltd., etc. The dynamic index-oriented map object 201 is a center-facing item in the JSON-LD code of the business entity's website. In an embodiment, the AOCLIE updates the website by connecting the dynamic index-oriented map object 201 with the linked data nodes 202 to the website, for example, using an application programming interface (API) key, which facilitates dynamic changes to the website for dynamically optimizing the website.

After the dynamic index-oriented map object 201 with the linked data nodes 202 is generated and connected to the website, the dynamic index-oriented map object 201 shifts the linked data nodes 202 to fit appropriate categories of the structured data objects for display on any location application, for example, any map application, or any web resource, for example, any search engine, social network, or database, in response to a search query 203. Once the automated object creation and location integration engine (AOCLIE) creates and optimizes the dynamic index-oriented map object 201, the dynamic index-oriented map object 201 pushes one of the linked data nodes 202 to the front for specific searches, filling in blanks in the business entity's website, and ensuring characteristics of the business entity's website are crawled, cataloged, and displayed by any location application or any web resource containing information of the business entity relevant to the search query 203. Furthermore, using the dynamic index-oriented map object 201 with the linked data nodes 202, the AOCLIE automatically integrates one or more locations of the business entity into one or more of multiple location applications, thereby connecting a virtual space of the business entity to a physical location of a real-world space represented in the location applications.

Consider an example where the automated object creation and location integration engine (AOCLIE) receives an input uniform resource locator (URL) of a website of a business entity entered in a search bar rendered by a user interface of the AOCLIE. The AOCLIE accesses and analyzes the website; identifies location-based objects in the website by scrolling for zip code, street address, etc., rendered in any natural language on the website; transforms the location-based objects into geocoded data by deriving geocodes or reverse geocodes from the location-based objects; and automatically creates structured data objects for the geocoded data. In an embodiment, the AOCLIE employs different technologies, for example, artificial intelligence, machine learning, fuzzy logic, and data science in various algorithms to analyze the website. The AOCLIE automatically creates the structured data objects using, for example, templates, content from the website, and best practices from a collaborative schema data source or a third-party organization, for example, schema.org, to suit each type of JSON-LD object category. In an embodiment, the AOCLIE identifies and weighs schema codes by a combination of analyzing the content of the website and the content related to the website from one or more search engines and/or media platforms, analyzing the categorized repository of schema codes, and determining optimal schema codes that are relevant to search.

The automated object creation and location integration engine (AOCLIE) filters the schema codes, for example, using search engine optimization (SEO) best practices documentation, the content present on the website, and the categorized repository to determine the optimal schema codes. The categorized repository comprises categories that affect a website's content, for example, local business, postal address, zip code, hours, product, offerings, services, etc. Of each individual structured data tag, the AOCLIE drills down on the specific item properties that affect a website's content based on multiple websites designed, the results gained from designing those websites, and an understanding of what businesses try to be found for in search engines with keywords. The AOCLIE utilizes the SEO best practices defined based on standards set, for example, by Google LLC, SEOmoz, Inc., etc., and SEO campaigns. Businesses try to be found for their name, their industry, their location and local area, and the products and services they provide. The AOCLIE, therefore, targets the coding on those areas. In an embodiment, SEO guidelines implemented to automatically create the structured data objects by applying the schema codes into a website's content are written directly into the hypertext markup language (HTML) code of the website. The AOCLIE targets the indexing schema codes into what will have the strongest impact and most relevance for a business and its website based on SEO best practices and data for what businesses are trying to be found.

In an embodiment, the automated object creation and location integration engine (AOCLIE) determines the optimal schema codes, for example, based on a business type or an industry type and search ranking factors listed, for example, by a guide of search engine optimization (SEO) best practices. The search ranking factors in a hierarchy comprise, for example, business name, location of the business, products and services offered by the business, business details, phrases about products and services offered by the business, phrases that help the AOCLIE identify the location of the business, new content that is categorized as a piece of creative work or a specific piece of creative work, reviews related to the business, people relevant to the business, etc. The AOCLIE implements a guideline or a standard on how to code the determined optimal schema codes into a website's content for automatically creating the structured data objects. The use of these optimal schema codes with new content updates creates a more powerful optimization for a website. By utilizing the method disclosed herein on each new article, whitepaper, review, blog post, video content, audio content, biography of a website, etc., the AOCLIE adds in backend coding assistance to the website's overall optimization effort.

The automated object creation and location integration engine (AOCLIE) stores the created structured data objects in the object database for the business entity. The AOCLIE connects the stored structured data objects to the dynamic index-oriented map object 201 as linked data nodes 202, for example, JSON-LD nodes, around a core of the business entity. The AOCLIE automatically integrates one or more locations of the business entity into a wide range of location applications through the dynamic index-oriented map object 201, for example, using an API key. The dynamic index-oriented map object 201 defines points and locations throughout the internet. In an embodiment, the AOCLIE incorporates the dynamic index-oriented map object 201 into the website, for example, using the JavaScript® programming language or other functionally equivalent programming languages. When a search engine, social media platform, or database attempts to connect to the content on the website through a primary connection channel, for example, a search query 203, the dynamic index-oriented map object 201 fits an appropriate one of its linked data nodes 202 to the search query 203. The linked data nodes 202 also fit the geographic coordinates into a wide range of location applications.

The automated object creation and location integration engine (AOCLIE) processes geographic coordinate system (GCS) parameters of a location of a business entity, specifically a location-based business, and creates a dynamic index-oriented map object 201 configured to fit the GCS parameters into a range of location applications, for example, map applications. The AOCLIE defines an architecture of a virtual space by connecting the virtual space to a physical location of a real-world space. The AOCLIE connects the virtual space to the physical space by using the dynamic index-oriented map object 201 that defines points and locations throughout the internet. The dynamic index-oriented map object 201 contains all the pertinent geographic location information needed for the full range of map applications, for example, Google Maps and Waze® of Google LLC, Apple Maps of Apple, Inc., the Mapquest® web mapping platform of MapQuest, Inc., Bing® Maps of Microsoft Corporation, OpenStreetMap® of OpenStreetMap Foundation, etc. The dynamic index-oriented map object 201 allows integration of one or more locations of the business entity into multiple location applications, thereby placing that business entity's location into the full spectrum of location applications that use the business entity's location. By connecting the business entity's location to JSON-LD coding, the AOCLIE standardizes the use of location-based information for evolving artificial intelligence (AI), thereby allowing future location systems and location applications to easily include the business entity.

Figure 3:
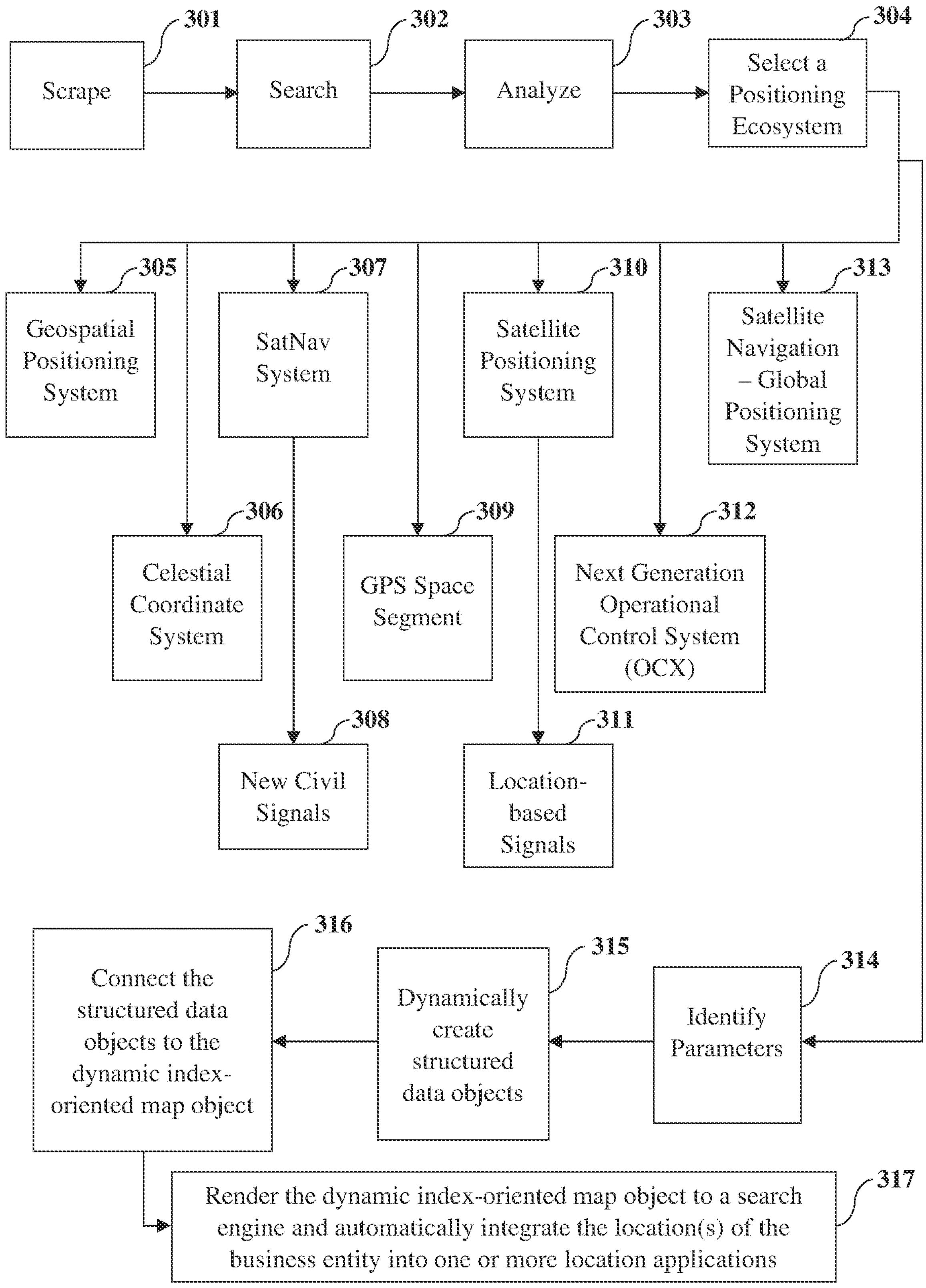
FIG. 3 exemplarily illustrates a flowchart comprising steps of an embodiment of the method for automatically creating structured data objects for location-based information of a business entity defined by a selected positioning ecosystem to automatically integrate one or more locations of the business entity into multiple location applications.

FIG. 3 exemplarily illustrates a flowchart comprising steps of an embodiment of the method for automatically creating structured data objects for location-based information of a business entity defined by a selected positioning ecosystem to automatically integrate one or more locations of the business entity into multiple location applications. Consider an example where the automated object creation and location integration engine (AOCLIE) receives an input, for example, a uniform resource locator (URL) of a website of the business entity via a user interface, for example, a graphical user interface, a command-line interface, etc., rendered by the AOCLIE. The process initiates with the AOCLIE searching the URL of the website. The AOCLIE accesses the website and scrapes 301 website content comprising, for example, textual content, video content, audio content, animation content, multimedia content, etc., using the URL of the website. In this example, the textual content of the website comprises location-based information of the business entity. The AOCLIE performs data scraping, also known as web scraping, of the website using, for example, automated data extraction software, web scraping tools, etc., to extract the website content. The AOCLIE identifies tags in the website content and classifies the tagged content for identifying the location-based objects. The AOCLIE searches 302 for and analyzes 303 location-based objects associated with one or more locations of the business entity rendered in one or more languages in the extracted website content.

The location-based objects comprise location data associated with one or more of multiple positioning ecosystems. Parameters for each positioning ecosystem are different and based on the data scraping process and analysis of the location-based objects, the automated object creation and location integration engine (AOCLIE) identifies and selects 304 a positioning ecosystem to search and appropriately fetch relevant parameters from database systems or schemas of the selected positioning ecosystem for dynamically creating and applying schema codes to the location-based objects and thereafter, presenting the structured data objects and in turn, the dynamic index-oriented map object created therefrom to one or more search engines and location applications. In an embodiment, if there is incomplete information in the structured data object, the AOCLIE generates and renders electronic forms to the business entity for completing the required information. The AOCLIE selects 304 the positioning ecosystem from multiple positioning ecosystems associated with the collaborative schema data source, for example, schema.org, used for determining optimal schema codes. The positioning ecosystems comprise, for example, a geospatial positioning system 305, a celestial coordinate system 306, a satellite navigation (SatNav) system 307 that provides new civil signals 308, the global positioning system (GPS) space segment 309, a satellite positioning system 310 that provides other location-based signals 311, a next generation operational control system (OCX) 312, a satellite navigation—GPS 313, a geographic coordinate system (GCS) (not shown), etc.

The geospatial positioning system 305 incorporates a global positioning system (GPS), geographic information systems (GISs), and remote sensing technology for collecting, storing, retrieving, and displaying a large amount of location-based information in a spatial context. The celestial coordinate system 306 is a reference system configured to define positions of objects on a celestial sphere. In the celestial coordinate system, the North and South celestial poles are determined by projecting the rotation axis of the Earth to intersect the celestial sphere, which in turn defines a celestial equator. The celestial equivalent of latitude is referred to as declination and is measured in degrees North, that is, positive numbers, or South, that is, negative numbers, of the celestial equator. The celestial equivalent of longitude is referred to as right ascension and is measured in degrees or in time comprising hours, minutes, and seconds. The satellite navigation (SatNav) system 307 provides autonomous geospatial positioning using satellites, thereby allowing receivers to determine their location in terms of longitude, latitude, and altitude/elevation. A SatNav system having global coverage is referred to as a global navigation satellite system (GNSS). The new civil signals 308 are navigational signals configured for civilian use. The new civil signals 308 comprise, for example, L2C, L5, L1C, codeless GPS signals, semi-codeless GPS signals, etc., according to http://www.gps.gov. The new civil signals 308 use a modernized civil navigation (CNAV) message format that is more flexible than the legacy navigation (LNAV) message on the original civil signal, that is, a civilian acquisition (C/A) code signal. CNAV messages are provisioned for improved GPS navigation using the new civil signals L2C and L5.

The GPS space segment 309 comprises a constellation of satellites transmitting radio signals to users. According to http://www.gps.gov, the satellites in the GPS constellation are arranged into six equally-spaced orbital planes surrounding the Earth. Each plane contains four slots occupied by baseline satellites. This 24-slot arrangement ensures users can view at least four satellites from virtually any point on the planet. The satellites in the GPS constellation comprise, for example, Block IIA satellites, Block IIR satellites, Block IIR-M satellites, Block IIF satellites, GPS III satellites, and GPS IIIF satellites. The Block IIA satellites are second generation, advanced satellites. The Block IIR satellites are replenishment or replacement satellites. The Block IIR-M satellites are modernized satellites that include a new military signal and an L2C civil signal. The Block IIF satellites are follow-on satellites. The GPS III satellites are third generation, GPS satellites and the GPS IIIF are third generation, follow-on GPS satellites. Examples of the satellite positioning system 310 are the global positioning system (GPS) and the global navigation satellite system (GLONASS) that provide location-based signals 311. The next generation operational control system (OCX) 312 is the future version of the GPS control segment according to http://www.gps.gov. The OCX 312 commands modernized and legacy GPS satellites, manages civil and military navigation signals, and provides cybersecurity for next generation GPS operations. The satellite navigation—global positioning system (GPS) 313 is a global navigation satellite system that provides geolocation and time information to GPS receivers positioned on or near the earth. The geographic coordinate system (GCS) is a system that uses three-dimensional surfaces, for example, a spherical surface, an ellipsoidal surface, etc., to determine locations on the earth. The geographic coordinate system references any location on the earth by a point with longitude and latitude coordinates.

After selection of the positioning ecosystem, the automated object creation and location integration engine (AOCLIE) identifies 314 and fetches relevant parameters from database systems of the selected positioning ecosystem for transforming the identified location-based objects into geocoded data and for dynamically creating schema codes for the geocoded data. In an embodiment, the identified parameters constitute the geocoded data for the location-based objects. The AOCLIE communicates with a collaborative schema data source, for example, schema.org, via a network to determine optical schema codes for the geocoded data. The collaborative schema data source maintains schemas for various positioning ecosystems. The AOCLIE dynamically creates 315 structured data objects for the geocoded data by applying the schema codes to the geocoded data. The AOCLIE generates a dynamic index-oriented map object for the created structured data objects specific to one or more locations of the business entity and connects 316 the created structured data objects to the dynamic index-oriented map object by creating linked data nodes from the created structured data objects with the dynamic index-oriented map object as a core.

In an example, the automated object creation and location integration engine (AOCLIE) automatically creates structured data objects for the geocoded data, for example, geographic coordinates or parameters of a selected positioning ecosystem such as the geospatial positioning system 305, the celestial coordinate system 306, the SatNav system 307, the GPS space segment 309, etc.; generates a dynamic index-oriented map object for the created structured data objects; and connects the created structured data objects to the dynamic index-oriented map object by creating linked data nodes from the created structured data objects with the dynamic index-oriented map object as a core as disclosed in the code snippet below:

```
<script type="application/ld+json">
{
"@context": "https://schema.org/",
"@type": "Map",
"name": "MetaSense Marketing Management Inc.",
"hasMap": {
"@type": "Map",
"mapType": { "@id": "https://schema.org/VenueMap" },
"url": "https://www.metasensemarketing.com/"
}
}
</script>
<script type="application/ld+json">
{
"@context": "https://schema.org",
"@type": "Place",
"geo": {
"@type": "GeoCoordinates",
"latitude": "40.75",
"longitude": "73.98"
},
"name": "MetaSense Marketing Management Inc."
}
</script>
<script type="application/ld+json">
{
"@context": "https://schema.org",
"@type": "Place",
  "geoIntersects":{
    "@type":"GeospatialGeometry ",
    "name":"Digital Power",
    "description":"geospatial positioning system",
  },
  "geoEquals":{
    "@type":"Place",
    "name":"Digital Marketing Agency",
    "latitude":"39.956175",
    "longitude":"−75.191729"
  },
"name": "MetaSense Marketing Management Inc."
}
</script>
<script type="application/ld+json">
{
"@context": "https://schema.org",
"@type": "Place",
  "geoIntersects":{
    "@type":"GeospatialGeometry ",
    "name":"Digital Power",
    "description":"celestial coordinate system",
  },
  "geoEquals":{
    "@type":"Place",
    "name":"Digital Marketing Agency",
    "latitude":"39.956175",
    "longitude":"−75.191729"
  },
"name": "MetaSense Marketing Management Inc."
}
</script>
<script type="application/ld+json">
{
"@context": "https://schema.org",
"@type": "Place",
  "geoIntersects":{
    "@type":"GeospatialGeometry ",
    "name":"Digital Power",
    "description":"the SatNav system",
  },
  "geoEquals":{
    "@type":"Place",
```

-continued

```
        "name":"Digital Marketing Agency",
        "latitude":"39.956175",
        "longitude":"-75.191729"
    },
"name": "MetaSense Marketing Management Inc."
}
</script>
<script type="application/ld+json">
{
"@context": "https://schema.org",
"@type": "Place",
    "geoIntersects":{
        "@type":"GeospatialGeometry ",
        "name":"Digital Power",
        "description":"GPS space segment",
    },
    "geoEquals":{
        "@type":"Place",
        "name":"Digital Marketing Agency",
        "latitude":"39.956175",
        "longitude":"-75.191729"
    },
"name": "MetaSense Marketing Management Inc."
}
</script>
```

Similarly, the automated object creation and location integration engine (AOCLIE) utilizes the above-disclosed process and coding technique for processing parameters of other positioning ecosystems such as the GLONASS, the OCX, etc.; converting the parameters into schema codes for the geocoded data associated with the location-based objects; dynamically creating structured data objects for the geocoded data; generating the dynamic index-oriented map object for the created structured data objects; and connecting the created structured data objects as linked data nodes to the dynamic index-oriented map object. The AOCLIE renders 317 the dynamic index-oriented map object to a search engine and automatically integrates the locations of the business entity into one or more location applications using the dynamic index-oriented map object with the linked data nodes. In an embodiment, the AOCLIE renders appropriate linked data nodes of the dynamic index-oriented map object to one or more search engines and location applications. The AOCLIE executes the steps 314, 315, 316, and 317 for a selected one of the positioning ecosystems 305, 306, 307, 309, 310, 312, and 313 to achieve targeted results by creating schema codes based on the selected positioning ecosystem. The AOCLIE processes the parameters of a location of a business entity, specifically a location-based business, generates geographic coordinates therefrom, and creates structured data objects that fit those geographic coordinates into a range of map applications, for example, Google® Maps and Waze® of Google LLC, Apple Maps of Apple, Inc., the Mapquest® web mapping platform of MapQuest, Inc., Bing® Maps of Microsoft Corporation, OpenStreetMap® of OpenStreetMap Foundation, etc., thereby allowing the business entity to integrate with multiple different location applications simultaneously. The dynamic index-oriented map object assigned to the geographic coordinates generated by the AOCLIE contain pertinent geographic location information needed for the full range of map applications.

In an embodiment, the automated object creation and location integration engine (AOCLIE) dynamically assigns the structured data objects to a group in the form of the dynamic index-oriented map object. The AOCLIE presents the structured data objects and in turn, the dynamic index-oriented object created for the structured data objects to one or more web resources, for example, search engines. The AOCLIE outputs the structured data objects that optimally describe the website of the business entity and increase the interpretation and comprehensibility of the website by the web resources. The AOCLIE, therefore, automatically creates structured data objects for the location-based information of the business entity and dynamically optimizes the website of the business entity for enhanced indexation by search engines and improved listings in search results. The AOCLIE aids in enhancing the visibility of the website in results provided by search engines to maximize the number of visitors viewing the website.

Figure 4:
FIG. 4 exemplarily illustrates a screenshot showing a structured data object created for location-based information of a business entity.

FIG. 4 exemplarily illustrates a screenshot showing a structured data object created for location-based information of a business entity. The automated object creation and location integration engine (AOCLIE) transforms location-based objects identified from the business entity's website into geocoded data. The AOCLIE identifies relevant schema codes for the geocoded data using different criteria comprising, for example, templates, content derived from the website in one or more languages, structured data markup schemas, best practices associated with schemas to suit multiple linked data object categories, etc., and any combination thereof. The AOCLIE processes and transforms the geocoded data into structured data objects by applying the identified schema codes to the geocoded data, for example, in accordance with schemas provided by a collaborative schema data source or a third party organization that multiple search engines comply with, using artificial intelligence (AI)-based technology as disclosed in Applicant's patent titled "Content Validation and Coding for Search Engine Optimization" with application Ser. No. 15/834,228, issued as patent number U.S. Pat. No. 10,698,960. In an embodiment, the AOCLIE determines optimal schema codes from a categorized repository provided, for example, by schema.org or created by the AOCLIE, for automatic creation of the structured data objects. The AOCLIE identifies which schema codes are most relevant for a business entity's website for automatic creation of the structured data objects. The AOCLIE sifts through the schema codes and structured data tags in the categorized repository and targets the optimal schema codes with the structured data tags that are relevant to the business entity that provided the electronic document and a ranking requirement of the business entity. For example, the AOCLIE identifies "location" as a significant factor for a business entity to optimize the website of the business entity for web traffic. The AOCLIE identifies and weighs schema codes, for example, an offer schema code and a product schema code. The AOCLIE assigns a higher weight to the offer schema code than to the product schema code as the offer schema code allows location-based item properties. An example code snippet showing the structured data object generated for the geocoded data is disclosed below:

```
//GeoCoordinates Example
<script type="application/ld+json">
{
"@context": "https://schema.org",
"@type": "Place",
"geo": {
"@type": "GeoCoordinates",
"latitude": "39.81129977412216",
"longitude": "-74.92997603105727"
```

-continued

```
},
"name": "MetaSense Marketing"
}
</script>
```

Figure 5:
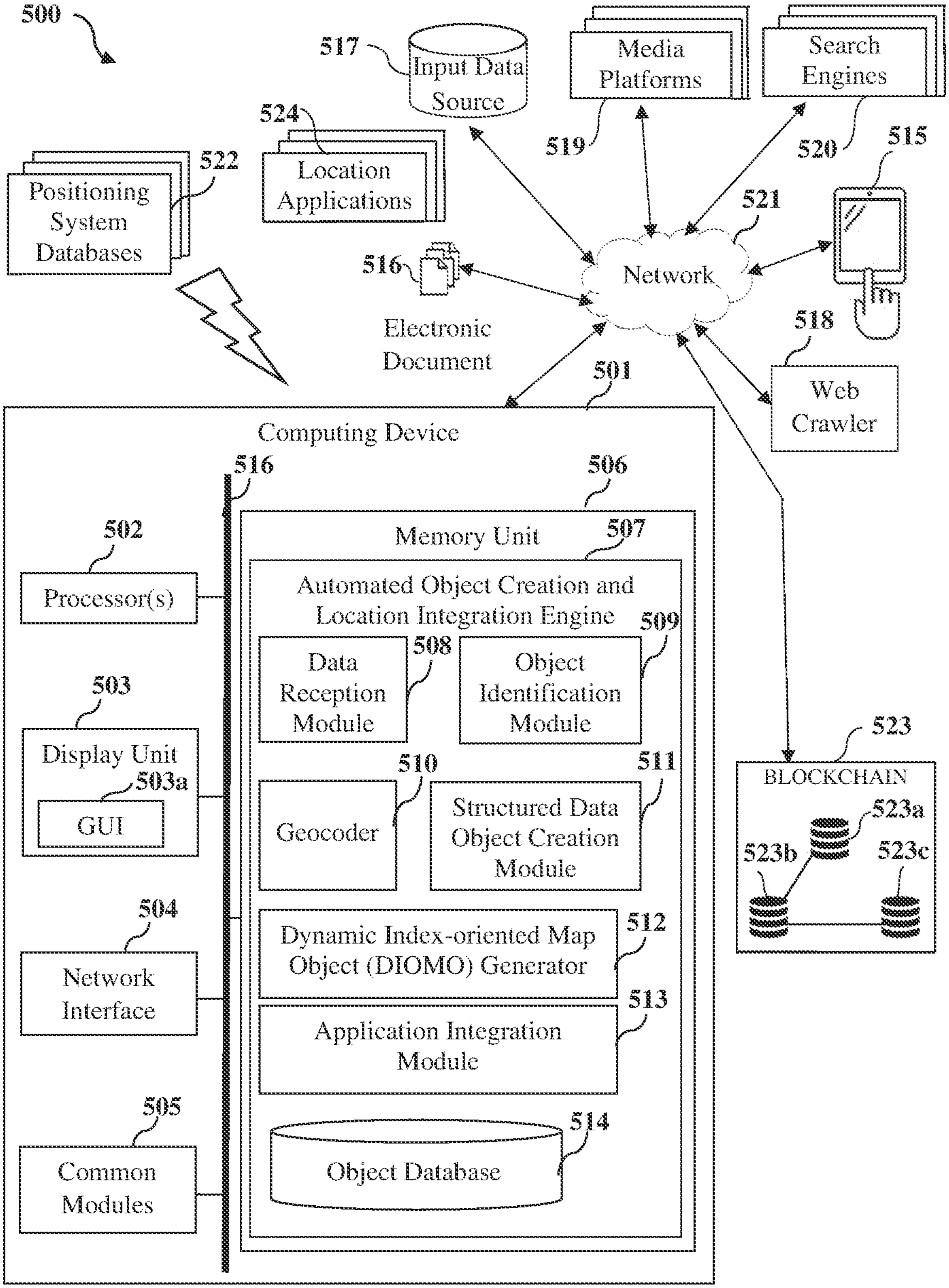
FIG. 5 illustrates an architectural block diagram of an exemplary implementation of a system for automatically creating structured data objects for location-based information of a business entity rendered in one or more of multiple languages in an electronic document to automatically integrate one or more locations of the business entity into multiple location applications.
Figure 6A:
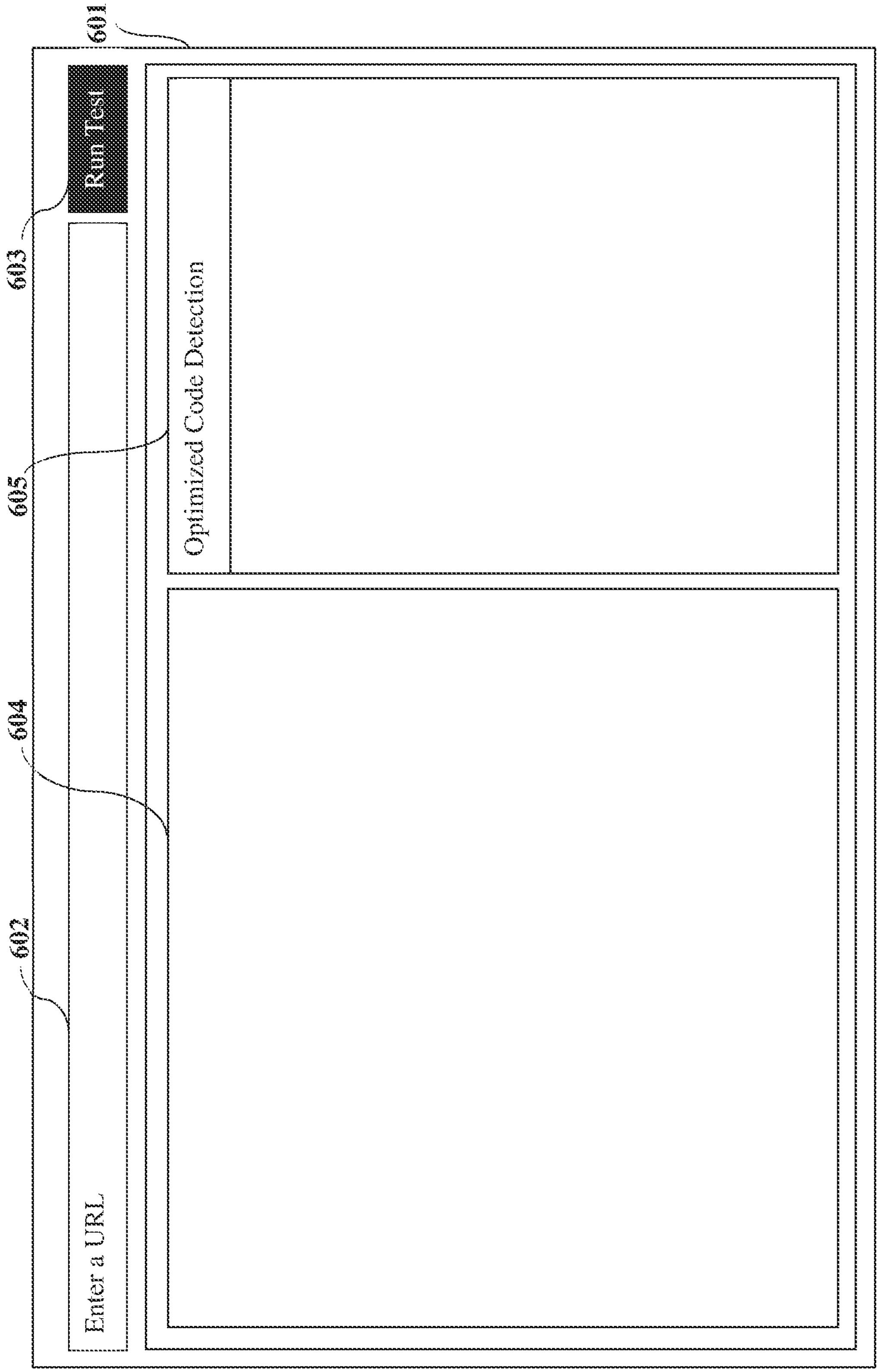
FIGS. 6A-6E exemplarily illustrate screenshots of graphical user interfaces rendered by the system comprising the automated object creation and location integration engine for automatically creating structured data objects for location-based information of a business entity rendered in one or more of multiple languages in an electronic document to automatically integrate one or more locations of the business entity into multiple location applications.
Figure 6B:
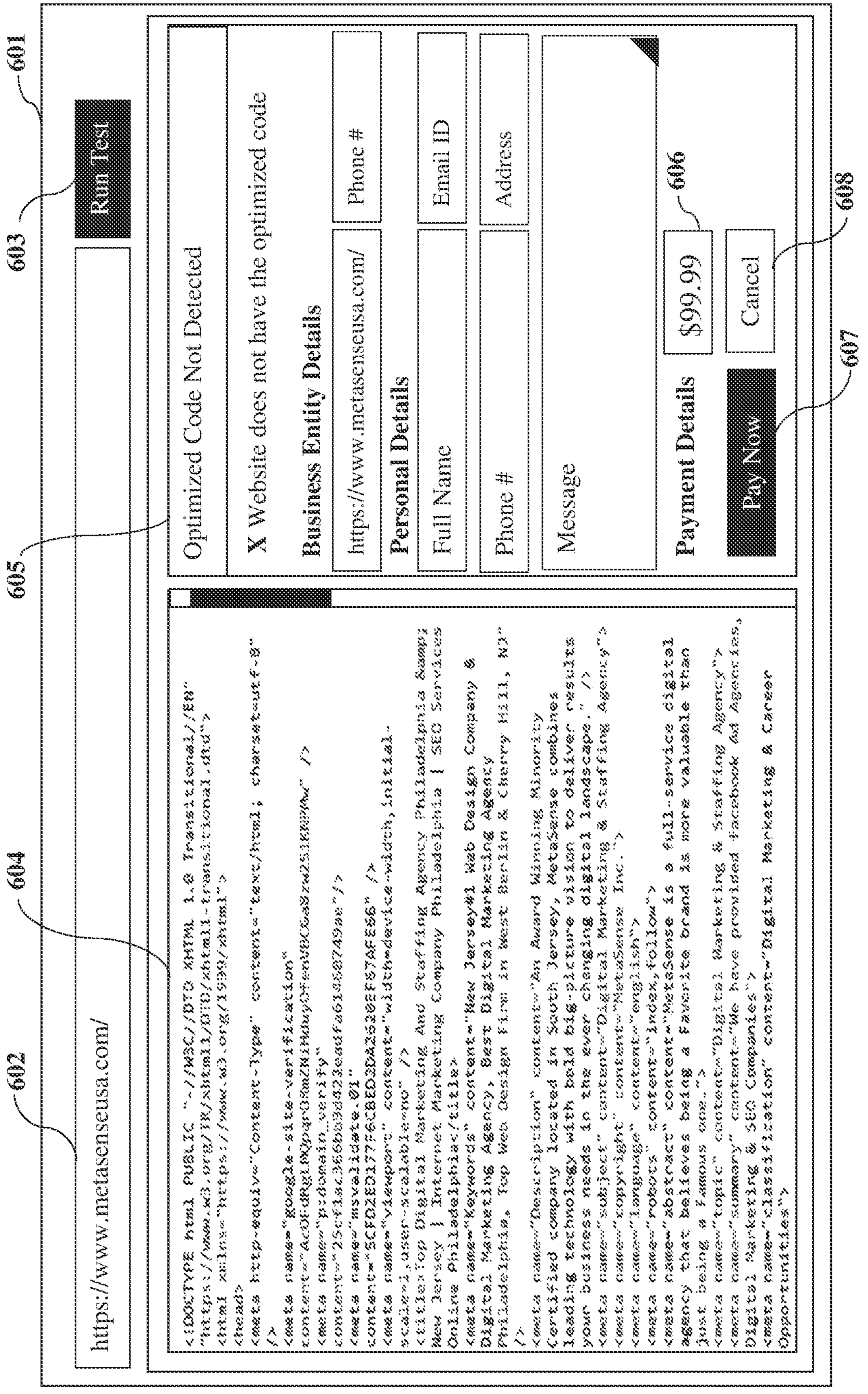
Figure 6C:
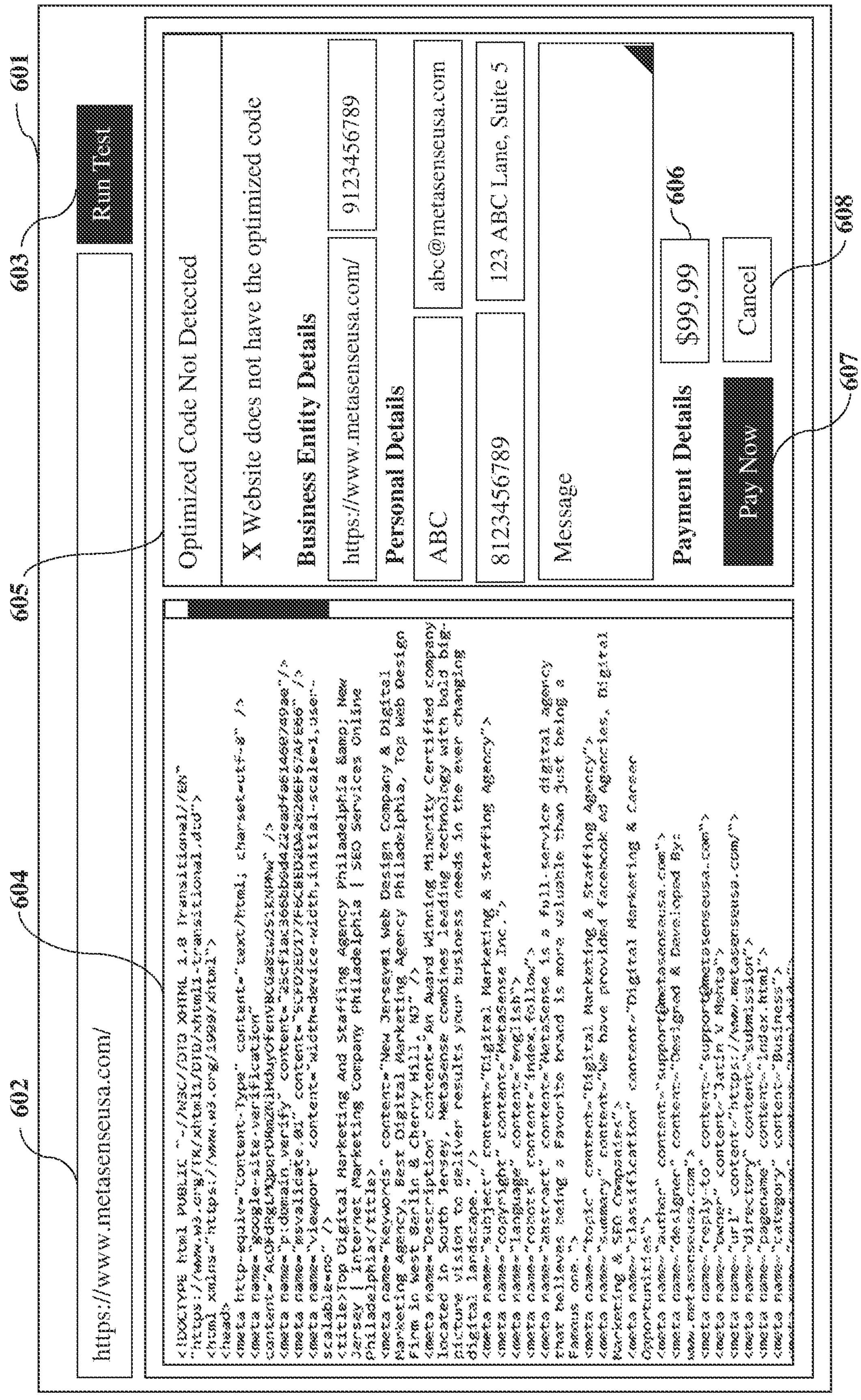
Figure 6D:
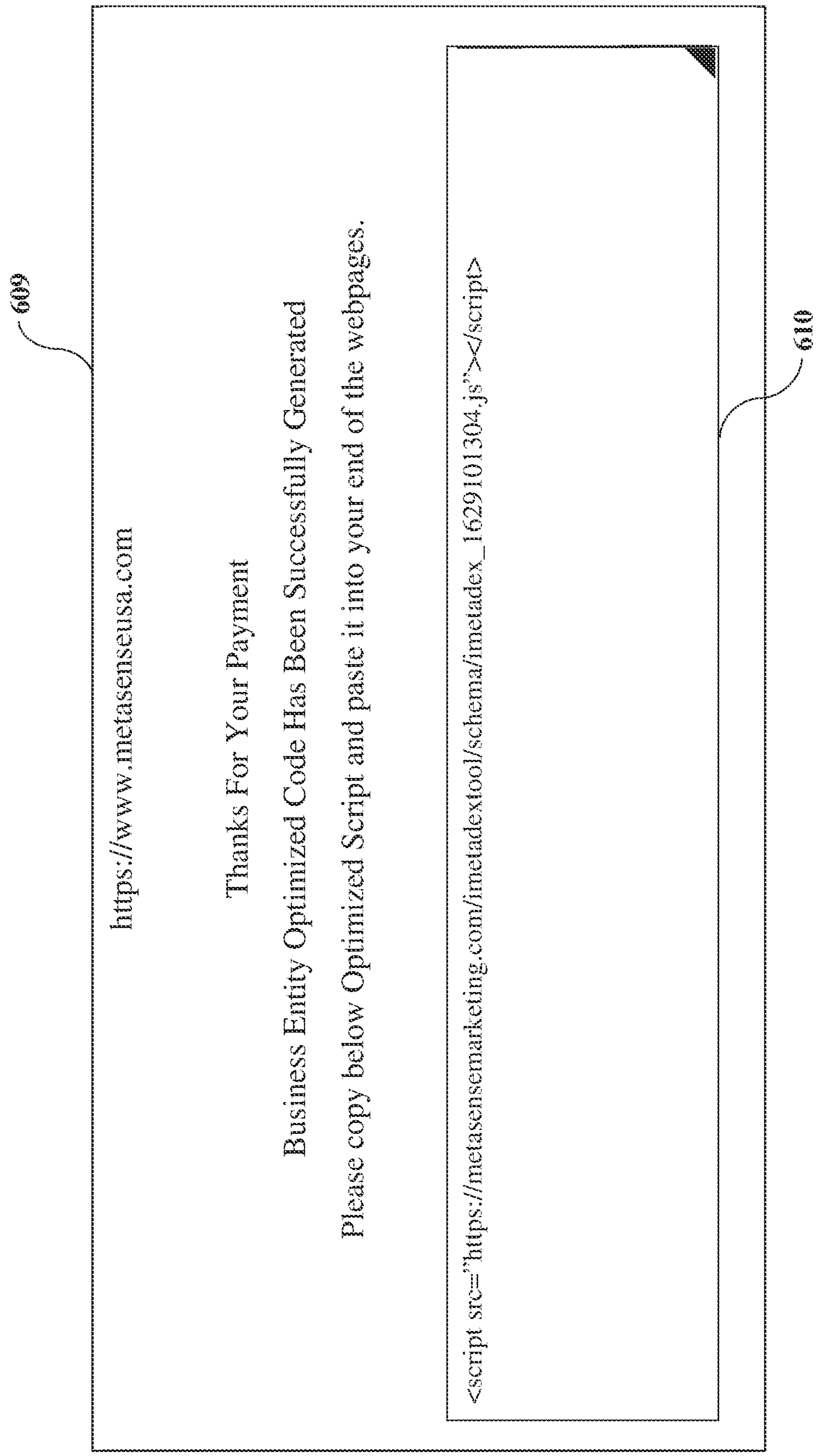
Figure 6E:
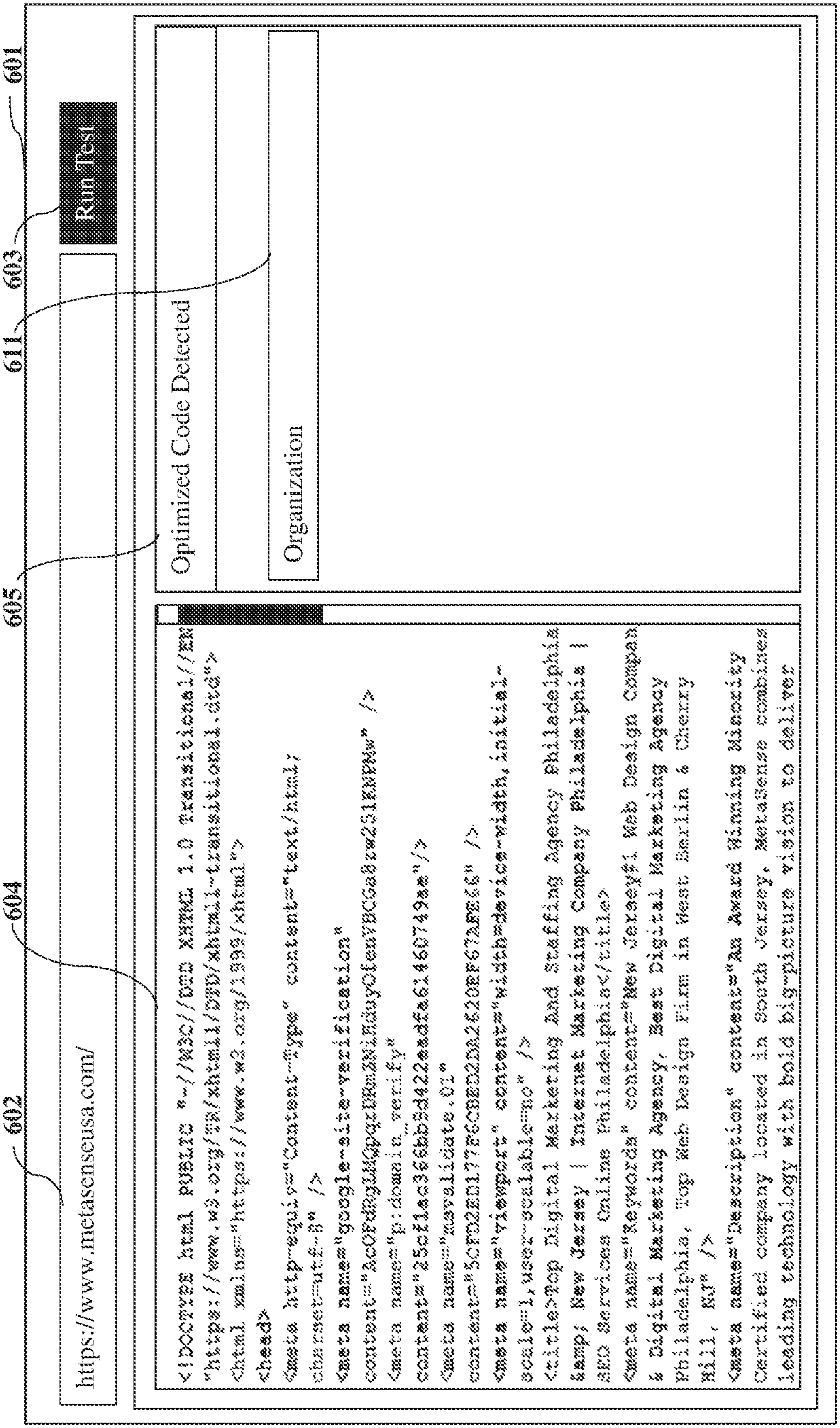

FIG. 5 illustrates an architectural block diagram of an exemplary implementation of a system 500 for automatically creating structured data objects for location-based information of a business entity rendered in one or more of multiple languages in an electronic document 516 to automatically integrate one or more locations of the business entity into multiple location applications 524. In an embodiment, the automated object creation and location integration engine (AOCLIE) 507 is deployed in a computing device 501 as exemplarily illustrated in FIG. 5. The computing device 501 is a computer system programmable using high-level computer programming languages. The computing device 501 is an electronic device, for example, one or more of a personal computer, a tablet computing device, a mobile computer, a mobile phone, a smartphone, a portable computing device, a laptop, a personal digital assistant, a wearable computing device such as smart glasses, a smart watch, etc., a touch centric device, a workstation, a client device, a server, a portable electronic device, a network-enabled computing device, an interactive network-enabled communication device, an image capture device, any other suitable computing equipment, combinations of multiple pieces of computing equipment, etc. In an embodiment, the AOCLIE 507 is implemented in the computing device 501 using programmed and purposeful hardware. In an embodiment, the AOCLIE 507 is a computer-embeddable system that automatically creates structured data objects for location-based information of a business entity rendered in one or more languages for automatically integrating one or more locations of the business entity into multiple location applications 524.

The automated object creation and location integration engine (AOCLIE) 507 in the computing device 501 communicates with an input data source 517, a web crawler 518, search engines 520, and media platforms 519 via a network 521, for example, a short range network or a long range network. The AOCLIE 507 in the computing device 501 also communicates with one or more positioning system databases 522, for example, databases associated with a global positioning system (GPS), a geospatial positioning system, a celestial coordinate system, and other global navigation satellite systems (GNSSs), for transforming location-based objects into geocoded data and implementing automated integration of one or more locations of the business entity into multiple location applications 524. The AOCLIE 507 interfaces with the input data source 517, the web crawler 518, the search engines 520, the media platforms 519, and one or more positioning system databases 522 to implement the automated structured data object creation and location integration functions disclosed herein, and therefore more than one specifically programmed computing system is used for implementing the automated structured data object creation and location integration service.

In an embodiment, the automated object creation and location integration engine (AOCLIE) 507 combines aspects of optimization between data crawled from the media platforms 519 with the search engines 520, for example, the Google® search engine of Google LLC, the Bing® search engine of Microsoft Corporation, the Yahoo® search engine of Yahoo! Inc., the Yandex® search engine of Yandex, Ltd., etc., to create a complete picture of the indexing capability of a uniform resource locator (URL) of the electronic document 516. The network 521 is, for example, one of the internet, satellite internet, an intranet, a wired network, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In an embodiment, the AOCLIE 507 is accessible to users, for example, through a broad spectrum of technologies and user devices 515 such as personal computers with access to the internet, internet-enabled cellular phones, tablet computing devices, etc.

In an embodiment, the automated object creation and location integration engine (AOCLIE) 507 is a cloud computing-based platform implemented as a service for automatically creating structured data objects for location-based information of a business entity rendered in one or more languages in an electronic document 516 to automatically integrate one or more locations of the business entity into multiple location applications 524. For example, the AOCLIE 507 is configured as a software as a service (SaaS) platform or a cloud-based software as a service (CSaaS) platform that automatically creates structured data objects for geocoded data of location-based objects, for example, geographic coordinates, address information, a location name, etc., in an electronic document 516 of a business entity and dynamically optimizes the electronic document 516. In another embodiment, the AOCLIE 507 is implemented as an on-premise platform comprising on-premise software installed and run on client systems on the premises of an organization.

As exemplarily illustrated in FIG. 5, the computing device 501 comprises a non-transitory, computer-readable storage medium, for example, a memory unit 506, for storing computer program instructions defined by modules, for example, 508, 509, 510, 511, 512, 513, 514, etc., of the automated object creation and location integration engine (AOCLIE) 507. As used herein, "non-transitory, computer-readable storage medium" refers to all computer-readable media that contain and store computer programs and data. Examples of the computer-readable media comprise hard drives, solid state drives, optical discs or magnetic disks, memory chips, a read-only memory (ROM), a register memory, a processor cache, a random-access memory (RAM), etc. The computing device 501 further comprises at least one processor 502 operably and communicatively coupled to the memory unit 506 for executing the computer program instructions defined by the modules, for example, 508, 509, 510, 511, 512, 513, 514, etc., of the AOCLIE 507. The memory unit 506 is used for storing program instructions, applications, and data. In an embodiment, the memory unit 506 is a random-access memory (RAM) or another type of dynamic storage device that stores information and instructions for execution by the processor(s) 502. The memory unit 506 also stores temporary variables and other intermediate information used during execution of the instructions by the processor 502. In an embodiment, the computing device 501 further comprises a read only memory (ROM) or other types of static storage devices that store static information and instructions for execution by the processor 502. In an embodiment, the modules, for example, 508, 509, 510, 511, 512, 513, 514, etc., of the AOCLIE 507 are stored in the memory unit 506.

The processor 502 is configured to execute the modules, for example, 508, 509, 510, 511, 512, 513, etc., of the automated object creation and location integration engine (AOCLIE) 507 for automatically creating structured data objects for location-based information of a business entity rendered in one or more languages in an electronic document 516 to automatically integrate one or more locations of the business entity into multiple location applications 524. The modules, for example, 508, 509, 510, 511, 512, 513, etc., of the AOCLIE 507, when loaded into the memory unit 506 and executed by the processor 502, transform the computing device 501 into a specially-programmed, special purpose computing device configured to implement the automated structured data object creation and location integration functionality disclosed herein. The processor 502 refers to one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, the processor 502 is implemented as a processor set comprising, for example, a programmed microprocessor and a math or graphics co-processor. The AOCLIE 507 is not limited to employing the processor 502. In an embodiment, the AOCLIE 507 employs a controller or a microcontroller.

As exemplarily illustrated in FIG. 5, the computing device 501 further comprises a data bus 516, a display unit 503, a network interface 504, and common modules 505. The data bus 516 permits communications between the components, for example, 502, 503, 504, 505, and 506 of the computing device 501. The display unit 503, via a graphical user interface (GUI) 503*a*, displays user interface elements such as input text fields, for example, for allowing a user to enter an identifier of the electronic document 516 such as a uniform resource locator (URL) of a website, to be optimized. In an embodiment, the automated object creation and location integration engine (AOCLIE) 507 renders the GUI 503*a* on the display unit 503 for receiving inputs from the user. The GUI 503*a* comprises, for example, an online web interface, a web-based downloadable application interface, a mobile-based downloadable application interface, etc.

The network interface 504 enables connection of the computing device 501 to the network 521. In an embodiment, the network interface 504 is provided as an interface card also referred to as a line card. The network interface 504 is, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol (TCP)/internet protocol (IP), interfaces based on wireless communications technology such as satellite technology, radio frequency technology, near field communication, etc. The common modules 505 of the computing device 501 comprise, for example, input/output (I/O) controllers, input devices, output devices, fixed media drives such as hard drives, removable media drives for receiving removable media, etc. The output devices output the results of operations performed by the automated object creation and location integration engine (AOCLIE) 507. For example, the AOCLIE 507 renders the results of electronic document optimization, for example, the structured data objects and the dynamic index-oriented map object with the linked data nodes connected to the electronic document 516, to the user of the AOCLIE 507 using the output devices. Computer applications and programs are used for operating the computing device 501. The programs are loaded onto fixed media drives and into the memory unit 506 via the removable media drives. In an embodiment, the computer applications and programs are loaded into the memory unit 506 directly via the network 521.

In an exemplary implementation illustrated in FIG. 5, the automated object creation and location integration engine (AOCLIE) 507 comprises a data reception module 508, an object identification module 509, a geocoder 510, a structured data object creation module 511, a dynamic index-oriented map object (DIOMO) generator 512, an application integration module 513, and an object database 514, stored in the memory unit 506 and executed by the processor 502 in the computing device 501. The data reception module 508 accesses the electronic document 516 using an identifier, for example, a uniform resource locator (URL) of the electronic document 516. In an embodiment, the data reception module 508 receives the electronic document 516 to be optimized from the input data source 517 of the business entity. The AOCLIE 507 receives the electronic document 516 through a direct access to files of the electronic document 516 stored at the backend or through an indirect access to the source code of the electronic document 516. For example, the AOCLIE 507 fetches a hypertext markup language (HTML) source code of the electronic document 516 and writes the fetched HTML source code into a log file. An example of a computer program code, for example, a hypertext preprocessor (PHP) code of the data reception module 508, executable by the processor 502 for detecting and receiving data of the electronic document 516 is disclosed below.

```
//Include Libraries
require("simplehtmldom/simple_html_dom.php");
function RemoveSpecialChar($str) {
    // Using str_replace( ) function
    $res = str_replace( array( '\'', '"', '{' , '}' , '[', ']' , ';', '<', '>' ), ' ', $str);
    return $res;
    }
```

-continued

```
$print__schema = ‘ ’
$present__schema = ‘ ’
$schema__not__exist = “”
$schema__not__exist__value = 1;
if(isset($__POST[‘check__result’]) && $__POST[‘check__result’]!=‘’) {
$get__live__url = $__POST[‘website__url’];
function addhttp($url) {
   if (!preg__match(“~^(?:f|ht)tps?://~i”, $url)) {
      $url = “http://” . $url;
   }
   return $url;
}
$website__url = addhttp($get__live__url);
$html = file__get__html($website__url);
//Get URL Source Code
$data = file__get__contents($website__url);
$get__source__code = htmlspecialchars($data);
//Website URL Incorrect
if ($data === false || $data==4001 ) {
echo “<script>window.location.href=‘index.php?msg=notconfirm’</script>”
exit( );
}
$table__heading__top__space = “”;
$present__schema = “”;
$counting = 1;
if((!$html->find(‘script[type=application/ld+json]’, 0))) {
   $schema__not__exist = “<div class=‘schema__not__exist’><i class=‘fa fa-times’></i>
Website Not Having iMetaDex&trade; Code.</div>”;
            $schema__not__exist__value = 0;
}
foreach($html->find(‘script[type=application/ld+json]’) as $schema) {
$schemas = $schema->innertext;
$arr = json__decode($schemas, true);
if(isset($arr[‘@graph’]))
{
            $master__schema = ‘Graph’;
}
else {
if(isset($arr[‘@type’]))
{
            $master__schema = $arr[‘@type’];
}
else {
            $master__schema = ‘’;
}
}
$master__code = “<tr><td colspan=‘2’
class=‘schema__heading’>“.$master__schema.”</td></tr>”
$present__schema .= “<a href=‘#“.$counting.”’><div
class=‘separate__schema’>“.$master__schema.”</div></a>”;
if($arr[‘@context’]==“http://schema.org”)
{
            $table__heading__top__space = “<tr><td colspan=‘2’ height=‘30’> <a
name=‘“.$counting.”’ id=‘“.$counting.”’></a></td></tr>”;
}
foreach($arr as $key => $value) {
            if (is__array($value))
            {
               $get__value = ‘’;
               //1st level array
               foreach($value as $key1 => $value1) {
               //2nd level inner array
               if (is__array($value1))
               {
               foreach($value1 as $key2 => $value2) {
               //3rd level inner array
               if (is__array($value2))
               {
               foreach($value2 as $key3 => $value3) {
                     /* $get__value .= $key3.“ : ”.$value3.“<br
     />”;*/
                     $get__value .= $key2.“ : ”.$key2.“<br />”;
               }
               }
               else {
                  $get__value .= $key2.“ : ”.$value2.“<br />”;
               }
               }
               }
```

-continued

```
                else {
                  $remove__0 = str__replace('0', '-', $key1);
                  $get__value .= $remove__0." : ".$value1."<br />"
                  }
                  }
                }
                else {
                  $get__value = $value;
                }
   $print__schema .= $table__heading__top__space.$master__code."<tr><td class='parameters'
valign='top'>".$key . "</td><td>".$get__value."</td></tr>"
                $table__heading__top__space = "";
                $master__code = '';
}
$counting++;
}
//Clear Libraries Cache
$error__message = "";
$html->clear( );
unset($html);
}
else {
                $get__source__code = '';
                $website__url = '';
}
```

The object identification module 509 searches for objects in the electronic document 516 and identifies location-based objects associated with one or more locations of the business entity in one or more of multiple languages in the electronic document 516. An example of a computer program code of the object identification module 509 executable by the processor 502 for identifying the location-based objects in the electronic document 516 is disclosed below.

```
//Include Libraries
require("simplehtmldom/simple__html__dom.php");
function RemoveSpecialChar($str) {
// Using str__replace( ) function
$res = str__replace( array( '\'', '"', '{' , '}' , '[', ']' , ';', '<', '>' ), ' ', $str);
return $res;
}
$print__schema = '';
$present__schema = '';
$schema__not__exist = "";
$schema__not__exist__value = 1;
$imetadex__detect = "";
if(isset($__POST['check__result']) && $__POST['check__result']!='') {
$create__url = $__POST['website__ssl'].$__POST['website__url'];
$get__live__url = $create__url;
function addhttp($url) {
   if (!preg__match("~^(?:flht)tps?://~i", $url)) {
      $url = "http://" . $url;
   }
   return $url;
}
$website__url = addhttp($get__live__url);
                $html = file__get__html($website__url);
if((!$html-
>find('script[src=https://www.imetadex.com/single/imetadex.js?partnerid='.$client__id.']',
0)))
                {
                  $html = file__get__html($website__url);
                }
                else {
                  $html = str__get__html($db__print__schema);
                }
                /*Check url added on website*/
                }
else {
                $db__print__schema = "";
                $html = file__get__html($website__url);
}
$data = file__get__contents($website__url);
$get__source__code = htmlspecialchars($data);
```

-continued

```
$codeicon = '<i class="fa fa-code" aria-hidden="true"></i>';
//Website URL Incorrect
if ($data === false || $data==4001 ) {
echo "<script>window.location.href='tool.php?msg=notconfirm'</script>";
exit( );
}
$table__heading__top__space = "";
$present__schema = "";
$counting = 1;
if((!$html->find('script[type=application/ld+json]', 0))) {
   $schema__not__exist= "<div class='schema__not__exist'><i class='fa fa-times'></i>
Website Not Having iMetaDex ™ Code.</div>";
            $schema__not__exist__value = 0;
            $imetadex__detect = "iMetaDex&trade; Not Found";
}
else {
            $imetadex__detect = "iMetaDex&trade; Detected";
}
foreach($html->find('script[type=application/ld+json]') as $schema) {
$schemas = $schema->innertext;
$arr = json__decode($schemas, true);
if(isset($arr['@graph']))
{
            $master__schema = 'Graph';
}
else {
if(isset($arr['@type']))
{
            $master__schema = $arr['@type'];
}
else {
               $master__schema = '';
}
}
foreach($arr as $key => $value) {
            if (is__array($value))
            {
               $get__value = '';
               //1st level array
               foreach($value as $key1 => $value1) {
               //2nd level inner array
               if (is__array($value1))
               {
               foreach($value1 as $key2 => $value2) {
               //3rd level inner array
               if (is__array($value2))
               {
               foreach($value2 as $key3 => $value3) {
                        /* $get__value .= $key3." : ".$value3."<br />"*/
                        $get__value .= $key2." : ".$key2."<br />"
               }
               }
               else {
                  $get__value .= $key2." : ".$value2."<br />"
               }
               }
               }
               else {
               $remove__0 = str__replace('0', '-', $key1);
               $get__value .= $remove__0." : ".$value1."<br />"
               }
               }
            }
            else {
               $get__value = $value;
            }
            $print__schema .= $table__heading__top__space.$master__code."<tr><td
class='parameters' valign='top'>".$key . "</td><td>".$get__value."</td></tr>"
            $table__heading__top__space = "";
            $master__code = '';
}
$counting++;
}
//Clear Libraries Cache
$error__message = "";
$html->clear( );
unset/$html);
}
else {
```

-continued

```
        $get_source_code = '';
        $website_url = '';
        $codeicon = '';
}
```

The geocoder 510 performs geocoding and/or reverse geocoding on the identified location-based objects to transform the identified location-based objects into geocoded data. In an embodiment, the geocoder 510 transforms the identified location-based objects into geocoded data, in communication with one or more positioning system databases 522. The positioning system databases 522 are associated with different positioning systems, for example, a geospatial positioning system, a celestial coordinate system, a satellite navigation system, the global positioning system, etc., as disclosed in the description of FIG. 3. The structured data object creation module 511 automatically creates structured data objects for the geocoded data based on configurable criteria comprising, for example, templates, content derived from the electronic document 516 in one or more of multiple languages, structured data markup schemas, best practices associated with schemas to suit multiple linked data object categories, etc., and any combination thereof. In an embodiment, the structured data object creation module 511 automatically creates the structured data objects using an artificial intelligence (AI)-based transformation of the geocoded data.

The structured data object creation module 511 stores the created structured data objects in the object database 514. The object database 514 is any storage area or medium that can be used for storing the structured data objects. In an embodiment, the object database 514 is any of a structured query language (SQL) database or a not only SQL (NoSQL) database. In an embodiment, the object database 514 is a location on a file system. In another embodiment, the object database 514 is a table configured to store the structured data objects in a tabular format, for example, an Excel® spreadsheet format of Microsoft Corporation. In another embodiment, the object database 514 is configured to be remotely accessible by the AOCLIE 507 in the computing device 501 via the network 521. In another embodiment, the object database 514 is configured as a cloud-based database implemented in a cloud computing environment.

The dynamic index-oriented map object (DIOMO) generator 512 generates a dynamic index-oriented map object for the created structured data objects specific to one or more locations of the business entity. The DIOMO generator 512 connects the structured data objects to the dynamic index-oriented map object by creating linked data nodes, for example, JavaScript Object Notation for Linked Data (JSON-LD) nodes, from the created structured data objects with the dynamic index-oriented map object as a core. The DIOMO generator 512 and/or the application integration module 513 connect the dynamic index-oriented map object with the linked data nodes to the electronic document 516, thereby facilitating dynamic changes to the electronic document 516 and dynamically optimizing the electronic document 516. In an embodiment, in response to a search query, the DIOMO generator 512 and/or the application integration module 513 fit one or more of the linked data nodes of the dynamic index-oriented map object to the search query.

In an embodiment, the application integration module 513 connects the dynamic index-oriented map object with the linked data nodes to the electronic document 516, for example, using an application programming interface (API) key. In another embodiment, the application integration module 513 integrates the AOCLIE 507 with APIs of multiple search engines 520, multiple media platforms 519, one or more positioning system databases 522, and one or more location applications 524. The application integration module 513 implements API key integration for accessing the APIs of the search engines 520 and the media platforms 519 as disclosed in Applicant's patent titled "Content Validation and Coding for Search Engine Optimization" with application Ser. No. 15/834,228, issued as patent number U.S. Pat. No. 10,698,960. Using API key integration, the application integration module 513 fetches data, for example, product details and other information available on the API such as name, price, description, location-based information, etc., using, for example, a client uniform resource locator (cURL) tool or other methods to post into the structured data objects. An example code illustrating the API key integration is disclosed below.

```
<?php
$url = "https://api.example.com/api/v2/list/4707689/leads";
$curl = curl_init($url);
curl_setopt($curl, CURLOPT_URL, $url);
curl_setopt($curl, CURLOPT_RETURNTRANSFER, true);
$headers = array(
  "X-Access-Key: 7775123456YRTVkn9EhohfPrIjt2d87FpPpJIaRDkt",
  "Content-Type: application/json",
);
curl_setopt($curl, CURLOPT_HTTPHEADER, $headers);
//for debug only!
curl_setopt($curl, CURLOPT_SSL_VERIFYHOST, false);
curl_setopt($curl, CURLOPT_SSL_VERIFYPEER, false);
$resp = curl_exec($curl);
curl_close($curl);
//var_dump($resp);
echo "<pre>$resp</pre>"
?>
```

In an embodiment, the application integration module 513 adds backlinks to the coded content through the media platforms 519. Furthermore, the application integration module 513 automatically integrates one or more locations of the business entity into one or more of multiple location applications 524 using the dynamic index-oriented map object with the linked data nodes. In an embodiment, the application integration module 513 executes an API configured to connect to multiple location applications 524, for example, Google® Maps and Waze® of Google LLC, Apple Maps of Apple, Inc., the Mapquest® web mapping platform of MapQuest, Inc., Bing® Maps of Microsoft Corporation, OpenStreetMap® of OpenStreetMap Foundation, Yelp® listings of Yelp, Inc., the Foursquare® location data platform of Foursquare Labs, Inc., yahoo!® Local listings of Yahoo! Inc., etc. The application integration module 513 uses an API key to boost the structured data of the business entity into various location applications 524 and stores the structured data into search engines 520 for improving search results and listings of the business entity. In an embodiment, the application integration module 513 communicates with one or more positioning system databases 522 for automatically integrating one or more locations of the business entity into one or more location applications 524 that are implemented using one or more positioning systems. In an embodiment, the location applications 524 utilize a script tag rendered by the application integration module 513 to automatically apply schema codes on webpages of their websites and fetch relevant data from the object database 514, thereby integrating the business entity's location into the location applications 524.

In an embodiment, the automated object creation and location integration engine (AOCLIE) 507 implements blockchain technology and protocols that utilize, for example, JavaScript Object Notation for Linked Data (JSON-LD), for executing the various analyses disclosed above in a secure, shared, and decentralized environment, and thereafter connecting the automatically created structured data objects as linked data nodes to the dynamic index-oriented map object. In an embodiment, the application integration module 513 implements a secure API connection with the electronic document 516 of the business entity through a blockchain 523 comprising multiple nodes 523*a*, 523*b*, and 523*c* in a decentralized environment to establish a secure connection and data transactions between the object database 514 and the electronic document 516. The blockchain 523 adds security in coding the electronic document 516. The AOCLIE 507 and in turn, the application integration module 513, communicates with the blockchain 523 via the network 521. The blockchain 523 is implemented as a distributed database that maintains a continuously growing list of records called blocks used for performing multiple functions in dynamically optimizing the electronic document 516. The application integration module 513 provides an API for blockchain development to provide added security during coding of the electronic document 516 for search engine optimization. The blockchain 523 creates an ordered, back-linked list of blocks, which are linked and secured using cryptography. A mathematical notation referred as a "hash" identifies each block and links back to the previous block. The sequences of hashes linking each block create a chain where any changes made to a block will change the hash of that block, which is recomputed and stored in the next block. This changes the hash of the next block, which is also recomputed and so on until the end of the chain. The system 500 disclosed herein implements the blockchain 523 in a distributed network. The blockchain 523 provides a secure interface between the object database 514 and the electronic document 516 to allow the AOCLIE 507 to implement coding of the electronic document 516 using the determined optimal schema codes. In an embodiment, the blocks in the blockchain 523 implemented by the AOCLIE 507 are hypertext markup language (HTML) coding updates that are transferred from the AOCLIE 507 to the electronic document 516.

The processor 502 retrieves instructions defined by the data reception module 508, the object identification module 509, the geocoder 510, the structured data object creation module 511, the dynamic index-oriented map object (DIOMO) generator 512, and the application integration module 513 from the memory unit 506 for executing the respective functions disclosed above. The data reception module 508, the object identification module 509, the geocoder 510, the structured data object creation module 511, the DIOMO generator 512, and the application integration module 513 of the automated object creation and location integration engine (AOCLIE) 507 are disclosed above as software executed by the processor 502. In an embodiment, the modules, for example, 508, 509, 510, 511, 512, 513, 514, etc., of the AOCLIE 507 are implemented completely in hardware. In another embodiment, the modules, for example, 508, 509, 510, 511, 512, 513, 514, etc., of the AOCLIE 507 are implemented by logic circuits to carry out their respective functions disclosed above. In another embodiment, the AOCLIE 507 is also implemented as a combination of hardware and software and one or more processors, for example, 502, that are used to implement the modules, for example, 508, 509, 510, 511, 512, 513, 514, etc., of the AOCLIE 507.

For purposes of illustration, the disclosure herein refers to the modules, for example, 508, 509, 510, 511, 512, 513, 514, etc., of the AOCLIE 507 being run locally on a single computing device 501; however the scope of the system 500 and the method disclosed herein is not limited to the modules, for example, 508, 509, 510, 511, 512, 513, 514, etc., of the AOCLIE 507 being run locally on a single computing device 501 via the operating system and the processor(s) 502, but extends to the modules, for example, 508, 509, 510, 511, 512, 513, 514, etc., of the AOCLIE 507 being run remotely over the network by employing a web browser and a remote server, a mobile phone, or other electronic devices. In an embodiment, one or more portions of the system 500 disclosed herein are distributed across one or more computer systems (not shown) coupled to the network 521.

The non-transitory, computer-readable storage medium disclosed herein stores computer program instructions executable by at least one processor 502 for automatically creating structured data objects for location-based information of a business entity rendered in one or more languages in an electronic document 516 to automatically integrate one or more locations of the business entity into multiple location applications 524. The computer program instructions implement the processes of various embodiments disclosed above and perform additional steps that may be required and contemplated for automatically creating structured data objects for location-based information of a business entity rendered in one or more languages in an electronic document 516 to automatically integrate one or more locations of the business entity into multiple location applications 524. When the computer program instructions are executed by the processor(s) 502, the computer program instructions cause the processor(s) 502 to perform the steps of the method for automatically creating structured data objects for location-based information of a business entity rendered in one or more languages in an electronic document 516 to automatically integrate one or more locations of the business entity into multiple location applications 524 as disclosed in the descriptions of FIGS. 1-4. In an embodiment, a single piece of computer program code comprising computer program instructions performs one or more steps of the method disclosed in the descriptions of FIGS. 1-4. The processor(s) 502 retrieves these computer program instructions and executes them.

A module, or an engine, or a unit, as used herein, refers to any combination of hardware, software, and/or firmware. As an example, a module, or an engine, or a unit includes hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. In an embodiment, the computer program codes comprising computer readable and executable instructions are implemented in any programming language, for example, C, C++, C#, Java®, JavaScript®, Fortran, Ruby, Perl®, Python®, Visual Basic®, hypertext preprocessor (PHP), Microsoft® .NET, Objective-C®, Hadoop® of the Apache Software Foundation, the Solidity contract oriented programming language, Lisp, ArcGIS® of Environmental Systems Research Institute, Inc., etc. In another embodiment, other object-oriented, functional, scripting, and/or logical programming languages are also used. In an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

The system 500 comprising the automated object creation and location integration engine (AOCLIE) 507 and the method disclosed herein provide an improvement in search engine optimization (SEO), structured data, and location integration, computer-related technology. In the system 500 and the method disclosed herein, the design and the flow of interactions between the AOCLIE 507, the input data source 517, the web crawler 518, the collaborative schema data source(s), the search engines 520, the media platforms 519, the positioning system databases 522, the location applications 524, and the user devices 515 are deliberate, designed, and directed. Every uniform resource locator (URL) of the electronic document 516, received by the AOCLIE 507 via a user interface such as a graphical user interface (GUI) 503*a* provided by the AOCLIE 507, is configured by the AOCLIE 507 to steer the URL towards a finite set of predictable outcomes. The AOCLIE 507 implements one or more specific computer programs to direct the URL towards a set of end results. The interactions designed by the AOCLIE 507 allow the AOCLIE 507 to identify location-based objects associated with one or more locations of the business entity in one or more languages in the electronic document 516 identified by the URL; transform the identified location-based objects into geocoded data; automatically create structured data objects for the geocoded data based on configurable criteria; store and maintain the create structured data objects in the object database 514, and from these structured data objects, through the use of other, separate and autonomous computer programs, generate a dynamic index-oriented map object for the structured data objects specific to one or more locations of the business entity; connect the structured data objects to the dynamic index-oriented map object by creating linked data nodes from the structured data objects with the dynamic index-oriented map object as a core; and automatically integrate one or more locations of the business entity into one or more of the location applications 524 using the dynamic index-oriented map object with the linked data nodes. The generation of the dynamic index-oriented map object with the linked data nodes triggers the automatic integration of one or more locations of the business entity into a wide range of location applications 524. The separate and autonomous computer programs also connect the dynamic index-oriented map object with the linked data nodes to the electronic document 516. This creation of the structural data objects and connection of the dynamic index-oriented map object with the linked data nodes to the electronic document 516 are used as triggers to code the electronic document 516 and facilitate dynamic changes to the electronic document 516 for dynamically optimizing the electronic document 516 for search engine optimization. To perform the above disclosed method steps requires seven or more separate computer programs and subprograms, the execution of which cannot be performed by a person using a generic computer with a generic program.

FIGS. 6A-6E exemplarily illustrate screenshots of graphical user interfaces (GUIs) 601 and 609 rendered by the system comprising the automated object creation and location integration engine (AOCLIE) for automatically creating structured data objects for location-based information of a business entity rendered in one or more of multiple languages in an electronic document, for example, a website, to automatically integrate one or more locations of the business entity into multiple location applications. Consider an example where a website of a business entity identified by a uniform resource locator (URL), www.metasenseusa.com, is to be optimized by the AOCLIE. The AOCLIE renders a graphical user interface (GUI) 601 comprising an input field 602 for entering the URL of the website as exemplarily illustrated in FIG. 6A. The GUI 601 further comprises fields 604 and 605 for displaying a source code of the website and notifications and other information of the business entity. A user associated with the business entity inputs the URL "www.metasenseusa.com" into the input field 602 on the GUI 601 as exemplarily illustrated in FIG. 6B, and clicks a "Run Test" button 603 provided on the GUI 601.

The automated object creation and location integration engine (AOCLIE) accesses the website using the URL of the website. In an embodiment, the AOCLIE executes the web crawler 518 exemplarily illustrated in FIG. 5, to crawl the URL and access the website. The web crawler 518 crawls, parses, and indexes objects comprising content, for example, textual content, image content, audio content, video content, animation content, multimedia content, etc., and any combination thereof, in one or more of multiple languages on the website. The AOCLIE fetches and displays the hypertext markup language (HTML) source code of the website in the field 604 on the GUI 601 as exemplarily illustrated in FIG. 6B. On accessing the website and analyzing the source code of the website, the AOCLIE determines whether the website is optimized with structured data objects. If the website is optimized with the structured data objects, the AOCLIE displays the optimized code of the website on the GUI 601. On determining that the website is not optimized, the AOCLIE displays a notification that the optimized code is not detected in the field 605 as exemplarily illustrated in FIG. 6B, and provides an option to optimize the website. In an embodiment, the AOCLIE provides an option to optimize the website for a fee. In this embodiment, the GUI 601 displays the fee to be paid in a field 606 on the GUI 601 and provides control elements, for example, control buttons "Pay Now" 607 and "Cancel" 608 as exemplarily illustrated in FIG. 6B, to proceed with the payment or the cancelation of the automated structured data object creation and location integration service provided by the AOCLIE. If the user decides to proceed with the automated structured data object creation and location integration service provided by the AOCLIE, the user enters details of the business entity in the field 605 on the GUI 601 and clicks on the control button "Pay Now" 607 as exemplarily illustrated in FIG. 6C. The AOCLIE processes the payment and after successful payment confirmation, the AOCLIE proceeds to optimize the website.

In this example, the automated object creation and location integration engine (AOCLIE) identifies location-based objects associated with one or more locations of the business entity in one or more of multiple languages, for example, natural languages such as English, Mandarin, Hindi, French, German, Spanish, Italian, Turkish, etc., in the website. The AOCLIE, in communication with one or more positioning system databases 522 exemplarily illustrated in FIG. 5, then transforms the identified location-based objects into geocoded data as disclosed in the description of FIG. 3. The AOCLIE then automatically creates structured data objects for the geocoded data based on configurable criteria as disclosed in the description of FIG. 1. In an embodiment, the AOCLIE configures the structured data objects, for example, with hypertext markup language (HTML) markups that can be integrated into the website.

The automated object creation and location integration engine (AOCLIE) generates a dynamic index-oriented map object for the structured data objects specific to the business entity. The dynamic index-oriented map object configures the structured data objects based on requirements of the business entity's website to be read by web resources, for example, search engines, social networks, databases such as JavaScript Object Notation (JSON) databases, etc. The AOCLIE stores the structured data objects in the object database. The AOCLIE connects the structured data objects to the dynamic index-oriented map object by creating linked data nodes, for example, JavaScript Object Notation for Linked Data (JSON-LD) nodes, from the structured data objects with the dynamic index-oriented map object as a core. The AOCLIE connects the dynamic index-oriented map object with the linked data nodes to the website, thereby facilitating dynamic changes to the website and dynamically optimizing the website as disclosed in the descriptions of FIGS. 1-3. On completing the optimization of the website, the AOCLIE renders a confirmation of the payment and optimization of the website to the user on the GUI 609 as exemplarily illustrated in FIG. 6D. The AOCLIE also renders an output optimized script, for example, as a JavaScript code, to be pasted at the end of each webpage of the business entity's website. For example, the AOCLIE renders the following script in an output field 610 on the GUI 609 as exemplarily illustrated in FIG. 6D: "<script src="https://metasensemarketing.com/imetadextool/schema/imetadex_1629101304.js"></script>"

In an embodiment, the automated object creation and location integration engine (AOCLIE) instructs the user to insert the optimized script into a header file and/or a footer file of the website to allow the AOCLIE to verify the authenticity of the business entity. After the script is implemented in the business entity's website, the user may verify the implementation by re-entering the URL of the website in the input field 602 on the GUI 601 and clicking the "Run Test" button 603 provided on the GUI 601 as exemplarily illustrated in FIG. 6E. In response, the AOCLIE confirms the implementation by displaying a notification "Optimized Code Detected" in the field 605 on the GUI 601 as exemplarily illustrated in FIG. 6E. The field 605 displays a representation 611 of the structured data object automatically created for "Organization" defining the business entity as exemplarily illustrated in FIG. 6E. When a search engine receives a search query related to the business entity, the AOCLIE fits one or more of the linked data nodes of the dynamic index-oriented map object connected to the website to the search query.

In an embodiment, the automated object creation and location integration engine (AOCLIE) scans the JavaScript Object Notation (JSON) code of the website. When the AOCLIE receives the URL of the website, the AOCLIE searches for the presence of a script tag, for example, <script type="application/ld+json"> on each webpage of the website. On identifying the script tag, the AOCLIE retrieves parameters and fetches schema codes of the webpage. In an example, on identifying the presence of media files in the JSON code during the analysis of the JSON code, the AOCLIE determines whether the tag associated with the media file is a location tag, and accordingly, fetches schema codes for the location-based object, automatically creates a structured data object for the geocoded data of the location-based object by applying the corresponding schema code to the geocoded data, and connects the structured data object to the website's profile defined by the dynamic index-oriented map object. In an embodiment, during the analysis of the objects identified in the website, the AOCLIE determines the category of the website, for example, restaurant, sports, satellite communication, etc., by executing an artificial intelligence (AI) algorithm. The AOCLIE determines optimal schema codes for the website based on the category of the website. The AOCLIE retrieves data, for example, a title indicated by a hypertext markup language (HTML) tag such as hl, description, etc., related to the website from a backend code of the website and introduces the retrieved data into an optimized code, for example, a JSON code, for the website. The optimized code comprises the retrieved data and the optimal schema codes recommended by the AOCLIE for the website. The AOCLIE then renders a line of JSON code to be entered in a header file or a footer file of the website for executing the optimal schema codes across the webpages, for example, a home page, an "about us" page, etc., of the website. The dynamic index-oriented map object connected to the website allows integration of one or more locations of the business entity into multiple location applications, thereby placing that business entity's location into the full spectrum of location applications that use the business entity's location.

The automated object creation and location integration engine (AOCLIE) executes the heuristically-based coded algorithm that automatically analyzes, classifies, and then recodes the website for search engine optimization. During automatic creation of the structured data objects, the AOCLIE applies optimal schema codes and item properties to the right content, for example, the location-based information, on each webpage of a website by identifying which piece of content on the webpage benefits from the optimal schema codes. The AOCLIE provides control over the search results. The coding of the location-based information and other content of different types and combinations in the website with the optimal schema codes by the AOCLIE, which automatically creates the structured data objects and in turn the dynamic index-oriented map object with its linked data nodes, shapes the information the listings display on a search engine results page, thereby providing instructions on the content of the website and the method of indexing the content of the website to the search engines. In an embodiment, the AOCLIE applies the determined optimal schema codes directly to the coding of the website. In an embodiment, if the received electronic document, for example, a website is integrated with the application programming interface (API) key provided by the AOCLIE, then the AOCLIE allows users to initiate code changes onto the hypertext markup language (HTML) code of the website.

The automated object creation and location integration engine (AOCLIE) utilizes the optimal schema codes to improve the optimization of the website. The optimal schema codes in the content of the website, with the keyword strong quality and with the search engine optimization best practices, improve page-level link features and domain-level link authority features of the website. The page-level link features define the quality and quantity of links aimed at a single webpage of the website. The domain-level link authority features define the quality and quantity of links aimed at the entire website. The improvement in the page-level link features and the domain-level link authority features of the website facilitates enhanced ranking of the website on a search engine result page. Coding of the content of the website comprising keyword relevant content such as a piece of creative work or an article, and ongoing content native to a website, with the determined optimal schema codes by the AOCLIE improves user, usage, and traffic or query data, the page level, keyword-agnostic features, and page level keyword and content features of the website.

The focus of the system and the method disclosed herein is on an improvement to search engine optimization, structured data, and location integration, computer-related functionality itself, and not on economic or other tasks for which a generic computer is used in its ordinary capacity. Accordingly, the system and the method disclosed herein are not directed to an abstract idea. Rather, the system and the method disclosed herein are directed to a specific improvement to the way the computing system of the AOCLIE operates, embodied in, for example, accessing an electronic document using an identifier of the electronic document; identifying location-based objects associated with one or more locations of the business entity in one or more of multiple languages in the electronic document; transforming the identified location-based objects into geocoded data; automatically creating structural data objects for the geocoded data based on configurable criteria; generating a dynamic index-oriented map object for the created structured data objects specific to one or more locations of the business entity; connecting the created structured data objects to the dynamic index-oriented map object by creating linked data nodes from the structured data objects with the dynamic index-oriented map object as a core; and automatically integrating one or more locations of the business entity into one or more of a wide range of location applications using the dynamic index-oriented map object with the linked data nodes. The above-disclosed steps of the method disclosed here are automated using various technological solutions such as artificial intelligence, machine learning, fuzzy logic, data science, etc.

The system and the method disclosed herein has applications in multiple location-based services, for example, map citations, geofencing, etc., that require setting and rendering of correct locations and corresponding geofences of the business entity in various location applications. In an embodiment, the dynamic index-oriented map object with the linked data nodes is configured to be integrated into a map citation, which is incorporated in business directories, for example, Yelp® listings of Yelp, Inc., the Foursquare® location data platform of Foursquare Labs, Inc., yahoo!® Local listings of Yahoo! Inc., etc., where the business entity is mentioned by name. The automated object creation and location integration engine (AOCLIE) implements map citations using map application programming interfaces (APIs) of various online business directories. Geofencing utilizes a geofence, which is a virtual perimeter for a geographic zone in the real world. Geofencing utilizes location-based technologies, for example, the global positioning system (GPS) and/or ranges of internet protocol (IP) addresses to develop geofences. One or more geofences created by the business entity are used for tracking physical locations of location-aware devices, for example, GPS-enables smartphones, GPS-enabled navigation devices, etc., of users that are active in a geographic zone or geofence area. In an embodiment, the physical locations of the location-aware devices are considered as geocoded data and used for targeting advertisements to the users. The automated object creation and location integration engine (AOCLIE) identifies geofencing data and automatically inputs associated structured data objects into a website of the business entity. Using the dynamic index-oriented map object with the linked data nodes, the AOCLIE sets and renders the correct location(s) of the business entity in multiple locations applications, thereby improving search results connected to positioning systems such as the global positioning system (GPS), communication networks such as the Wi-Fi® communication network of Wi-Fi Alliance Corporation, etc. By rendering correct location-based information through the dynamic index-oriented map object with the linked data nodes, search engines and other media platforms can target more relevant information to users for generation of high-quality leads. Any future advancement in location-based technologies, for example, GPS, such as use of additional parameters to improve the GPS can be used to facilitate integration of the business entity's location into multiple location applications.

The automated object creation and location integration engine (AOCLIE) of the system and the method disclosed herein automatically creates structured data objects for location-based information of a business entity rendered in one or more of multiple languages in an electronic document to automatically integrate one or more locations of the business entity into multiple location applications, which drives business results, increases organic web traffic on search engines, boosts local search engine optimization, increases domain authority and page authority, reduces pay-per-click (PPC) cost, improves a brand's "find ability" in searches, controls how the brand appears in search results, improves find ability on multiple platforms, for example, mobile platforms, desktop platforms, voice platforms, etc., obtains return on investment (ROI) from events, courses, articles, audio, videos, etc., rendered on the business entity's website, attracts job applicants, improves content readability, provides optimal customer services in terms of providing answers to frequently asked questions (FAQs) in searches, improves communication with customers of interest, derives enhanced insights from analytics, indexes content fast, etc. Furthermore, the automatically created structured data objects and dynamic optimization of the business entity's website render rich results for products and services of the business entity, which increase click-through rates (CTRs) and draw more attention to listings of the business entity having positive reviews. Rendering rich results for products and services also increases conversion rates, because when more users view the business entity's listings and the listings are positive, the likelihood that the users will buy from the business entity increases. Furthermore, the more clicks generated lead to an increase in an organic ranking position for relevant search queries. This increase in the organic ranking position also relates to user expectations being met. The automatically created structured data objects help websites appear in a semantic network or a knowledge base of search engine providers, for example, Google's Knowledge Graph. Furthermore, the automatically created structured data objects are convenient to use in search algorithms, allow optimization of various online search profiles, improve business descriptions and service field descriptions, change search results, etc.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor, or a similar device. The "non-transitory, computer-readable storage media" also refer to any medium capable of storing or encoding a set of instructions for execution by a computer, a processor, or a similar device and that causes a computer, a processor, or a similar device to perform any one or more of the steps of the method disclosed herein. In an embodiment, the computer programs that implement the methods and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. Various aspects of the embodiments disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the embodiments disclosed herein are implemented as programmed elements, or non-programmed elements, or any suitable combination thereof.

Where databases are described such as the object database 314 exemplarily illustrated in FIG. 5, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via a network. In an embodiment, the computers communicate with the devices directly or indirectly, via a wired medium or a wireless medium such as the Internet, satellite internet, a local area network (LAN), a wide area network (WAN) or the Ethernet, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers.

The embodiments disclosed herein are not limited to a particular computer system platform, processor, operating system, or network. One or more of the embodiments disclosed herein are distributed among one or more computer systems, for example, servers configured to provide one or more services to one or more client computers, or to perform a complete task in a distributed system. For example, one or more of embodiments disclosed herein are performed on a client-server system that comprises components distributed among one or more server systems that perform multiple functions according to various embodiments. These components comprise, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

We claim:

1. A system for automatically creating structured data objects for location-based information of a business entity rendered within an electronic document that includes content in multiple languages, to automatically integrate one or more locations of the business entity into a plurality of location applications, the system comprising:

at least one processor;

a non-transitory, computer-readable storage medium operably and communicatively coupled to the at least one processor and configured to store computer program instructions executable by the at least one processor; and an automated object creation and location integration engine defining the computer program instructions, which when executed by the at least one processor, cause the at least one processor to:

access the electronic document of the business entity with the content in the multiple languages using an identifier of the electronic document;

identify location-based objects associated with the one or more locations of the business entity in the electronic document with the content in the multiple languages using artificial intelligence (AI), machine learning, fuzzy logic, and data science in algorithms to analyze the electronic document with the content in the multiple languages;

transform the identified location-based objects into geocoded data;

automatically and/or dynamically create structured data objects for the geocoded data based on configurable criteria;

generate a dynamic index-oriented map object for the created structured data objects specific to the one or more locations of the business entity;

connect the created structured data objects to the dynamic index-oriented map object by creating linked data nodes from the created structured data objects with the dynamic index-oriented map object as a core;

automatically and/or dynamically integrate the one or more locations of the business entity into one or more of the plurality of location applications using the dynamic index-oriented map object with the linked data nodes; and connect the dynamic index-oriented map object with the linked data nodes to the electronic document with the content in the multiple languages, thereby facilitating dynamic changes to the electronic document with the content in the multiple languages and dynamically optimizing the electronic document with the content in the multiple languages, wherein the dynamic changes to the electronic document with the content in the multiple languages are facilitated free of recreation of the structured data objects using the created linked data nodes of the dynamic index-oriented map object;

wherein structured data for location-based information rendered in the electronic document with the content in the multiple languages is generated, analyzed, and harnessed, to enhance search engine optimization of websites comprising the electronic document with the content in the multiple languages.

2. The system of claim 1, wherein the location-based objects comprise geographic coordinates, address information, a location name, physical locations of location-aware devices, and any combination thereof in the electronic document with the content in the multiple languages.

3. The system of claim 1, wherein the geocoded data comprises geographic coordinate system parameters, global positioning system parameters, geospatial positioning parameters, celestial coordinate system parameters, and global navigation satellite system parameters.

4. The system of claim 1, wherein the configurable criteria for automatically and/or dynamically creating the structured data objects for the geocoded data comprise templates, multilanguage content derived from the electronic document in a multilanguage format, structured data markup schemas, best practices associated with schemas to suit a plurality of linked data object categories, and any combination thereof.

5. The system of claim 1, wherein one or more of the computer program instructions defined by the automated object creation and location integration engine, which when executed by the at least one processor, cause the at least one processor to store the automatically and/or dynamically created structured data objects in an object database.

6. The system of claim 1, wherein one or more of the computer program instructions defined by the automated object creation and location integration engine, which when executed by the at least one processor, cause the at least one processor to automatically and/or dynamically create the structured data objects using machine learning software and/or an artificial intelligence-based transformation of the geocoded data.

7. The system of claim 1, wherein the linked data nodes of the dynamic index-oriented map object comprise one of: JavaScript Object Notation for Linked Data nodes, Microdata nodes, JavaScript Object Notation for Linked Data (JSON-LD) in a HTML script tag, or other similar technologies including artificial intelligence (AI) and machine learning (ML) generated code, and Resource Description Framework in Attributes nodes, and wherein the one or more locations of the business entity are automatically integrated into the one or more of the plurality of location applications through the dynamic index-oriented map object with the linked data nodes using an application programming interface key.

8. The system of claim 1, wherein the location applications comprise map applications, map citations, location tagging, geofencing applications, and navigation applications implemented using satellite-based positioning, navigation, and timing systems of different types, wherein the satellite-based positioning, navigation, and timing systems of different types constitute a global navigation satellite system comprising a global position system, a geospatial positioning system, and a celestial coordinate system.

9. The system of claim 1, wherein the identifier is a uniform resource locator of the electronic document with the content in the multiple languages, and wherein the electronic document with the content in the multiple languages is one of a website comprising the electronic document with the content in the multiple languages, and a webpage of the website comprising the electronic document with the content in the multiple languages.

10. A method employing an automated object creation and location integration engine defining computer program instructions executable by at least one processor for automatically creating structured data objects for location-based information of a business entity rendered within a electronic document that includes content in multiple languages, to automatically integrate one or more locations of the business entity into a plurality of location applications, the method comprising:

accessing the electronic document of the business entity with the content in the multiple languages using an identifier of the electronic document;

identifying location-based objects associated with the one or more locations of the business entity in the electronic document with the content in the multiple languages using artificial intelligence (AI), machine learning, fuzzy logic, and data science in algorithms to analyze the electronic document with the content in the multiple languages;

transforming the identified location-based objects into geocoded data;

automatically and/or dynamically creating structured data objects for the geocoded data based on configurable criteria;

generating a dynamic index-oriented map object for the created structured data objects specific to the one or more locations of the business entity;

connecting the created structured data objects to the dynamic index-oriented map object by creating linked data nodes from the created structured data objects with the dynamic index-oriented map object as a core;

automatically and/or dynamically integrating the one or more locations of the business entity into one or more of the plurality of location applications using the dynamic index-oriented map object with the linked data nodes; and connecting the dynamic index-oriented map object with the linked data nodes to the electronic document with the content in the multiple languages, thereby facilitating dynamic changes to the electronic document with the content in the multiple languages and dynamically optimizing the electronic document with the content in the multiple languages, wherein the dynamic changes to the electronic document with the content in the multiple languages are facilitated free of recreation of the structured data objects using the created linked data nodes of the dynamic index-oriented map object;

wherein structured data for location-based information rendered in the electronic document with the content in the multiple languages is generated, analyzed, and harnessed, to enhance search engine optimization of websites comprising the electronic document with the content in the multiple languages.

11. The method of claim 10, wherein the location-based objects comprise geographic coordinates, address information, a location name, physical locations of location-aware devices, and any combination thereof in the electronic document with the content in the multiple languages, and wherein the geocoded data comprises geographic coordinate system parameters, global positioning system parameters, geospatial positioning parameters, celestial coordinate system parameters, and global navigation satellite system parameters.

12. The method of claim 10, wherein the configurable criteria for automatically and/or dynamically creating the structured data objects for the geocoded data comprise templates, multilanguage content derived from the electronic document in a multilanguage format, structured data markup schemas, best practices associated with schemas to suit a plurality of linked data object categories, and any combination thereof.

13. The method of claim 10, further comprising storing the automatically and/or dynamically created structured data objects in an object database.

14. The method of claim 10, wherein the structured data objects are automatically or dynamically created using machine learning software and/or an artificial intelligence-based transformation of the geocoded data.

15. The method of claim 10, wherein the linked data nodes of the dynamic index-oriented map object comprise one of: JavaScript Object Notation for Linked Data nodes, Microdata nodes, JavaScript Object Notation for Linked Data (JSON-LD) in a HTML script tag, or other similar technologies including artificial intelligence (AI) and machine learning (ML) generated code, and Resource Description Framework in Attributes nodes, and wherein the one or more locations of the business entity are automatically integrated into the one or more of the plurality of location applications through the dynamic index-oriented map object with the linked data nodes using an application programming interface key.

16. The method of claim 10, wherein the location applications comprise map applications, map citations, location tagging, geofencing applications, and navigation applications implemented using satellite-based positioning, navigation, and timing systems of different types, wherein the satellite-based positioning, navigation, and timing systems of different types constitute a global navigation satellite system comprising a global position system, a geospatial positioning system, and a celestial coordinate system.

17. The method of claim 10, wherein the identifier is a uniform resource locator of the electronic document with the content in the multiple languages, and wherein the electronic document with the content in the multiple languages is one of a website comprising the electronic document with the content in the multiple languages, and a webpage of the website comprising the electronic document with the content in the multiple languages.

18. A non-transitory, computer-readable storage medium having embodied thereon, computer program instructions executable by at least one processor for automatically creating structured data objects for location-based information of a business entity rendered within a electronic document that includes content in multiple languages, to automatically integrate one or more locations of the business entity into a plurality of location applications, the computer program instructions when executed by the at least one processor cause the at least one processor to:

access the electronic document of the business entity with the content in the multiple languages using an identifier of the electronic document;

identify location-based objects associated with the one or more locations of the business entity in the electronic document with the content in the multiple languages using artificial intelligence (AI), machine learning, fuzzy logic, and data science in algorithms to analyze the electronic document with the content in the multiple languages;

transform the identified location-based objects into geocoded data;

automatically and/or dynamically create structured data objects for the geocoded data based on configurable criteria;

generate a dynamic index-oriented map object for the created structured data objects specific to the one or more locations of the business entity;

connect the created structured data objects to the dynamic index-oriented map object by creating linked data nodes from the created structured data objects with the dynamic index-oriented map object as a core;

automatically and/or dynamically integrate the one or more locations of the business entity into one or more of the plurality of location applications using the dynamic index-oriented map object with the linked data nodes; and connect the dynamic index-oriented map object with the linked data nodes to the electronic document with the content in the multiple languages, thereby facilitating dynamic changes to the electronic document with the content in the multiple languages and dynamically optimizing the electronic document with the content in the multiple languages, wherein the dynamic changes to the electronic document with the content in the multiple languages are facilitated free of recreation of the structured data objects using the created linked data nodes of the dynamic index-oriented map object;

wherein structured data for location-based information rendered in the electronic document with the content in the multiple languages is generated, analyzed, and harnessed, to enhance search engine optimization of websites comprising the electronic document with the content in the multiple languages.

19. The non-transitory, computer-readable storage medium of claim 18, wherein the location-based objects comprise geographic coordinates, address information, a location name, physical locations of location-aware devices, and any combination thereof in the electronic document with the content in the multiple languages, wherein the geocoded data comprises geographic coordinate system parameters, global positioning system parameters, geospatial positioning parameters, celestial coordinate system parameters, and global navigation satellite system parameters, wherein the location applications comprise map applications, map citations, location tagging, geofencing applications, and navigation applications implemented using satellite-based positioning, navigation, and timing systems of different types, wherein the satellite-based positioning, navigation, and timing systems of different types constitute a global navigation satellite system comprising a global position system, a geospatial positioning system, and a celestial coordinate system.

20. The non-transitory, computer-readable storage medium of claim 18, wherein the configurable criteria for automatically and/or dynamically creating the structured data objects for the geocoded data comprise templates, multilanguage content derived from the electronic document in a multilanguage format, structured data markup schemas, best practices associated with schemas to suit a plurality of linked data object categories, and any combination thereof.

21. The non-transitory, computer-readable storage medium of claim 18, wherein the linked data nodes of the dynamic index-oriented map object comprise one of: JavaScript Object Notation for Linked Data nodes, Microdata nodes, JavaScript Object Notation for Linked Data (JSON-LD) in a HTML script tag, or other similar technologies including artificial intelligence (AI) and machine learning (ML) generated code, and Resource Description Framework in Attributes nodes, and wherein the one or more locations of the business entity are automatically integrated into the one or more of the plurality of location applications through the dynamic index-oriented map object with the linked data nodes using an application programming interface key.

* * * * *